United States Patent
Mobasher et al.

(10) Patent No.: US 8,929,493 B2
(45) Date of Patent: Jan. 6, 2015

(54) MIXED RANK DOWNLINK COMPOUND MULTI-USER INTERFERENCE ALIGNMENT SCHEME

(75) Inventors: Amin Mobasher, Waterloo (CA); Yongkang Jia, Ottawa (CA); Alireza Bayesteh, Ottawa (CA)

(73) Assignee: Blackberry Limited, Waterloo, Ontario (CA)

( * ) Notice: Subject to any disclaimer, the term of this patent is extended or adjusted under 35 U.S.C. 154(b) by 0 days.

(21) Appl. No.: 13/822,528

(22) PCT Filed: Feb. 1, 2011
(Under 37 CFR 1.47)

(86) PCT No.: PCT/IB2011/050428
§ 371 (c)(1),
(2), (4) Date: Oct. 24, 2013

(87) PCT Pub. No.: WO2012/114148
PCT Pub. Date: Aug. 30, 2012

(65) Prior Publication Data
US 2014/0219373 A1    Aug. 7, 2014

(51) Int. Cl.
*H04L 1/02* (2006.01)
*H04B 7/04* (2006.01)
*H01Q 3/26* (2006.01)
*H04W 16/28* (2009.01)

(52) U.S. Cl.
CPC ........... *H04B 7/0456* (2013.01); *H01Q 3/2605* (2013.01); *H04B 7/0452* (2013.01); *H04B 7/0486* (2013.01); *H04W 16/28* (2013.01)
USPC .......................................... 375/346; 375/285

(58) Field of Classification Search
USPC ......... 375/259–260, 285, 316, 340, 346, 349, 375/347, 224
See application file for complete search history.

(56) References Cited

U.S. PATENT DOCUMENTS

| 5,852,630 | A | 12/1998 | Langberg et al. |
| 2005/0176436 | A1* | 8/2005 | Mantravadi et al. ......... 455/450 |

(Continued)

FOREIGN PATENT DOCUMENTS

| CN | 101394254 A | 3/2009 |
| CN | 101459461 A | 6/2009 |

(Continued)

OTHER PUBLICATIONS

Cadambe, V. R., et al.; "Interference Alignment and Spatial Degrees of Freedom for the K Usere Interference Channel"; IEEE International Conference on Communications 2008; p. 971-975; May 23, 2008.

(Continued)

*Primary Examiner* — Jean B Corrielus
(74) *Attorney, Agent, or Firm* — Cantor Colburn LLP

(57) ABSTRACT

A method, system and device are provided to enable one or more users to receive mixed-rank data from two transmitters by using an indexed list of linearly independent, predetermined vectors $v_{ref} = \{v_{ref}^1, \ldots, v_{ref}^M\}$ and channel knowledge $H_1, H_2$ from first and second transmitters to compute equivalent channel matrix information $H_i^{eq}$ based on the assigned or determined rank of the receiver. With this information, each transmitter selects $L_i$ receivers and constructs a transmitted signal by applying a selected precoding matrix to the mixed rank data, thereby eliminating interference to the rest of the receivers in the network so that a receiver can receive transmitted signals from both transmitters.

17 Claims, 9 Drawing Sheets

(56) References Cited

U.S. PATENT DOCUMENTS

| | | | |
|---|---|---|---|
| 2006/0269023 A1* | 11/2006 | Chimitt et al. | 375/350 |
| 2010/0034146 A1 | 2/2010 | Hou et al. | |
| 2010/0104037 A1* | 4/2010 | Jongren | 375/260 |
| 2010/0227613 A1 | 9/2010 | Kim et al. | |
| 2010/0232528 A1* | 9/2010 | Li et al. | 375/260 |
| 2010/0265813 A1 | 10/2010 | Pereira et al. | |
| 2011/0034135 A1 | 2/2011 | Ali et al. | |
| 2011/0051837 A1 | 3/2011 | Park et al. | |
| 2011/0176629 A1 | 7/2011 | Bayesteh et al. | |
| 2011/0200126 A1 | 8/2011 | Bontu et al. | |
| 2011/0200131 A1 | 8/2011 | Gao et al. | |
| 2011/0222469 A1 | 9/2011 | Ali et al. | |
| 2011/0261745 A1 | 10/2011 | Bontu et al. | |
| 2012/0046038 A1 | 2/2012 | Gao et al. | |
| 2013/0322361 A1 | 12/2013 | Ko et al. | |

FOREIGN PATENT DOCUMENTS

| | | |
|---|---|---|
| CN | 101615942 A | 12/2009 |
| CN | 101919171 A | 12/2010 |
| WO | 2008081715 A1 | 7/2008 |

OTHER PUBLICATIONS

Extended European Search Report for Application No. 13167278.4-1852, dated Oct. 7, 2013, pp. 1-8.

International Preliminary Report on Patentability dated Aug. 15, 2013 for PCT Application No. PCT/IB2011/050426, pp. 1-7.

International Preliminary Report on Patentability dated Aug. 15, 2013 for PCT Application No. PCT/IB2011/050427, pp. 1-6.

International Preliminary Report on Patentability dated Aug. 15, 2013 for PCT Application No. PCT/IB2011/050428, pp. 1-6.

International Search Report and Written Opinion dated Oct. 17, 2011 for Application No. PCT/IB2011/050426.

International Search Report and Written Opinion dated Nov. 2, 2011 for Application No. PCT/IB2011/050427.

International Search Report and Written Opinion dated Nov. 2, 2011 for Application No. PCT/IB2011/050428.

Viveck R. Cadambe, et al,"Interference Alignment and Degrees of Freedom of the K-User Interference Channel," IEEE Transactions on Information Theory, vol. 54, No. 8, pp. 3425-3441; Aug. 2008.

Onur Ozan Koyluoglu et al., "Interference Alignment for Secrecy," IEEE International Symposium on Information Theory, pp. 1-15, 2008.

Mohammad Ali Maddah-Ali, et al,"Communication Over MIMO X Channels:Interference Alignment, Decomposition, and Performance Analysis," IEEE Transactions on Information Theory, vol. 54, No. 8, pp. 1-14; Aug. 2008.

Chenwei Wang, "Aiming Perfectly in the Dark—Blind Interference Alignment Through Staggered Antenna Switching," School of Information Theory, USC, pp. 1-12, Aug. 2010.

Shin et al., "Interference alignment through user cooperation for two-cell MIMO interfering broadcast channels", Globecom Workshops (GC Wkshps), 2010 IEEE, Dec. 6, 2010, pp. 120-125.

Suh, Changho, et al.; "Downlink Interference Alignment"; IEEE Globecom 2010; p. 1-5; Dec. 10, 2010.

* cited by examiner

US 8,929,493 B2

MIXED RANK DOWNLINK COMPOUND MULTI-USER INTERFERENCE ALIGNMENT SCHEME

CROSS REFERENCED TO RELATED APPLICATIONS

This is a National Stage application of International Patent Application No. PCT/IB2011/050428, entitled "Mixed Rank Downlink Compound Multi-User Interference Alignment Scheme" by inventors Amin Mobasher, Yongkang Jia, and Alireza Bayesteh, filed on Feb. 1, 2011, the contents of which are incorporated by reference in their entirety.

BACKGROUND

One of the major challenges in wireless communication systems is to overcome interference caused by other users, such as when a mobile device in cellular systems receives interfering signals from multiple transmitters. Traditional schemes attempt to manage interference as noise or by orthogonalizing channel resources between different transmitters (base stations or access points) by assigning different frequency channels, time slots, or codes to different resources (e.g., FDMA/TDMA/CDMA). In addition, concurrent transmission techniques (interference alignment (IA)) have been proposed in which multiple senders jointly encode signals to multiple receivers so that interference is aligned and each receiver is able to decode its desired information. Interference alignment provides better performance than orthogonalization-based schemes by aligning the interference at a receiver coming from different sources in the least possible spatial dimensions to maximize the number of interference-free dimensions and hence, providing more degrees of freedom for signal transmission and improving the throughput performance. With interference alignment, a transmitter can partially or completely "align" its interference with unused dimensions of the primary terminals, thereby maximizing the interference-free space for the desired signal in an interference channel. For example, it has been shown that all the interference can be concentrated roughly into one half of the signal space at each receiver, leaving the other half available to the desired signal and free of interference. When considering sum capacity for n users in the high SNR regime, the sum capacity for each transmitter scaling as n/2 log(SNR) is achievable which is equivalent to n/2 degrees of freedom for the sum capacity for each transmitter. Moreover, for fixed SNR values, the sum capacity achieved by interference alignment has been shown to scale linearly with n. Interference alignment has also been considered in a Macro-cell scenario where multiple base stations (eNBs), each serving a rank-one user equipment (UE) device, collaborate with each other to decrease the effect of interference caused to each other's transmissions.

A significant challenge with existing interference alignment schemes is that they require perfect global channel knowledge about all channels in the network, which in turn imposes significant feedback overhead and coordination between nodes. In addition, existing interference alignment schemes are highly sensitive to channel estimation and quantization error, antenna configuration, and mobility. Accordingly, a need exists for improved methods, systems and devices for managing interference between network nodes to overcome the problems in the art, such as outlined above. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present disclosure may be understood, and its numerous objects, features and advantages obtained, when the following detailed description is considered in conjunction with the following drawings, in which.

DETAILED DESCRIPTION

Figure 1:
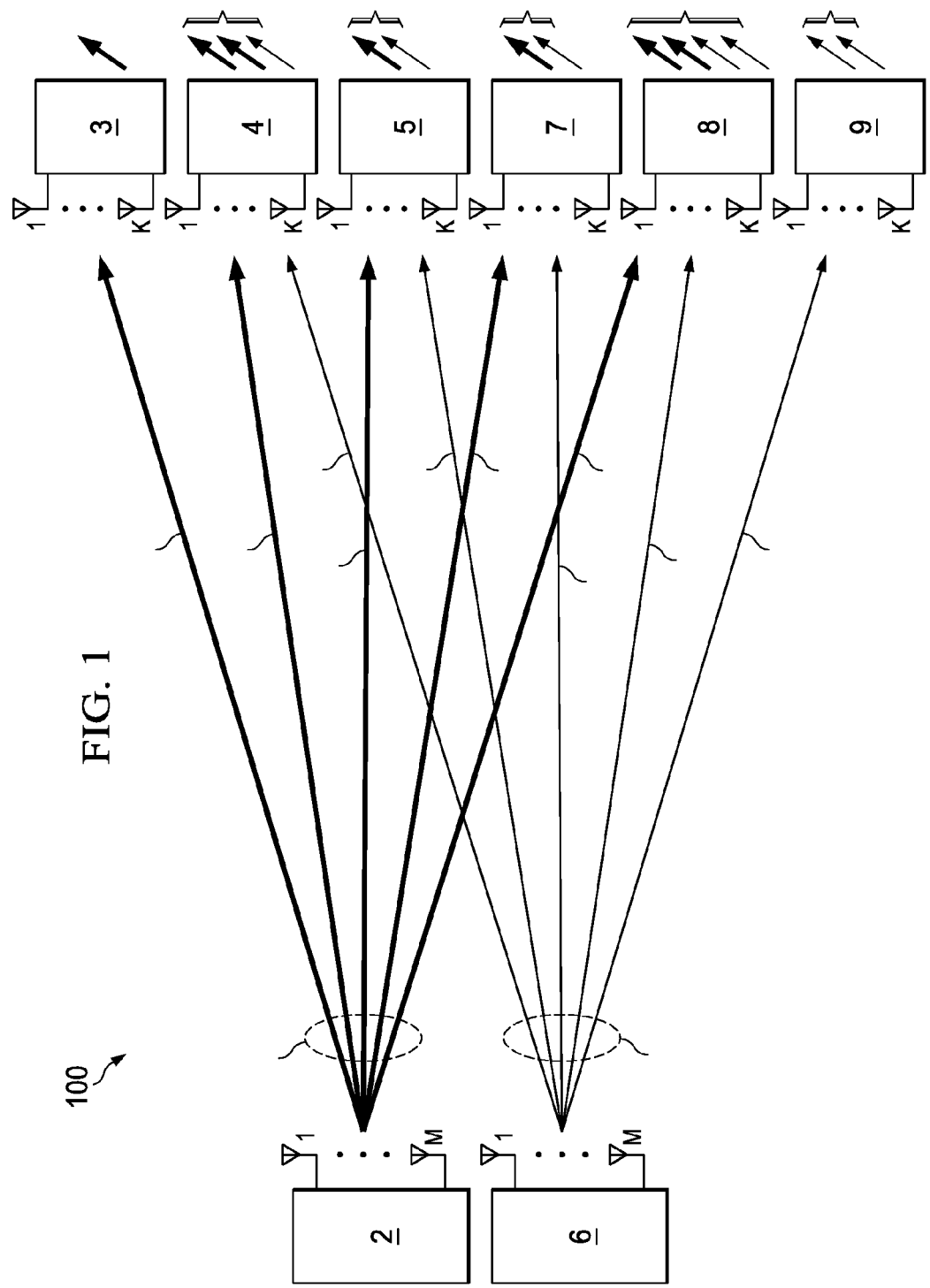
FIG. 1 is a schematic diagram showing components of a communication system in which there is mixed rank downlink compound multi-user interference alignment between two transmitters and one or more mixed rank receivers in accordance with selected embodiments of the present disclosure.

The present disclosure is directed in general to communications systems and associated method of operation. In one aspect, the present disclosure relates to an interference alignment scheme for use in a wireless communication system. An embodiment is directed to a method for receiving signals and aligning signal and interference at a rank d receiver having K receive antennas from first and second transmitters each having M transmit antennas, comprising: assembling at the receiver a first channel matrix ($H_1$) and a second channel matrix ($H_2$) for a first transmitter and a second transmitter, respectively, determining a first rank $d_1$ of a first signal received from the first transmitter, determining a second rank $d_2$ of a second signal received from the second transmitter, computing a first combining matrix ($r_1 = v_{ref}^H H_2^+$) from an inverse of the second channel matrix and $d_1$ predetermined vectors selected from a plurality of predetermined vectors having size M, computing a second combining matrix ($r_2 = v_{ref}^H H_1^+$) from an inverse of the first channel matrix and $d_2$ predetermined vectors selected from the plurality of predetermined vectors having size M, applying the first combining matrix to decode rank $d_1$ data signals received at the receiver from the first transmitter, where the first combining matrix projects all cross channels from the second transmitter to the $d_1$ predetermined vectors to reduce or eliminate interference from the second transmitter, and applying the second combining matrix to decode rank $d_2$ data signals received at the receiver from the second transmitter, where the second combining matrix projects all cross channels from the first transmitter to the $d_2$ predetermined vectors to reduce or eliminate interference from the first transmitter.

An embodiment is directed to a method for transmitting one or more signals from a first transmitter having M transmit antennas to one or more receivers affiliated with the first transmitter, where each of the one or more receivers has K receive antennas and receives interference from a second transmitter having M transmit antennas, comprising: acquiring at the first transmitter an equivalent direct channel matrix ($H_j^{eq}$) from each of the one or more receivers, obtaining a second transmitter maximum rank value ($d_{max}^2$) from a second transmitter which corresponds to a maximum transmission rank for any receiver affiliated with the second transmitter, selecting a subset of the one or more receivers and corresponding ranks for each selected receiver to receive a signal from the first transmitter such that the number of M transmit antennas is not less than a sum of the corresponding ranks and the second transmitter maximum rank value ($d_{max}^2$), obtaining an equivalent downlink channel matrix ($H_1^{eq}$) from the equivalent direct channel matrices for the selected subset of receivers, and computing a precoding matrix for a signal to be transmitted to the selected subset of receivers, where the precoding matrix is derived from the equivalent downlink channel matrix and from $d_{max}^2$ predetermined vectors selected from a plurality of predetermined vectors having size M to reduce or eliminate interference to any receivers receiving signals from the first transmitter or from the second transmitter.

An embodiment is directed to a user equipment device configured to align interference and receive rank d signaling over first and second channels from first and second transmitters each having M transmit antennas, comprising: an array of K receive antennas for receiving one or more signals over first and second channels from first and second transmitters each having M transmit antennas, and a processor configured to receive signals and align signal interference from the first and second transmitters by: computing a first channel matrix and second channel matrix for the first and second channels, respectively, determining a first rank $d_1$ and a second rank $d_2$ for a first signal and second signal received over the first and second channels, respectively, computing a first combining matrix ($r_1 = v_{ref}^H H_2^+$) as a product of an inverse of the second channel matrix and an Hermitian of $d_1$ predetermined vectors selected from a set of predetermined vectors having size M, where the set of predetermined vectors is known by the first and second transmitters and by any other user equipment devices affiliated with the first or second transmitters, computing a second combining matrix ($r_2 = v_{ref}^H H_1^+$) as a product of an inverse of the first channel matrix and an Hermitian of $d_2$ predetermined vectors selected from the set of predetermined vectors having size M, applying the first combining matrix to decode rank $d_1$ data signals received at the receiver from the first transmitter, where the first combining matrix projects all cross channels from the second transmitter to the $d_1$ predetermined vectors to reduce or eliminate interference from the second transmitter, and applying the second combining matrix to decode rank $d_2$ data signals received at the receiver from the second transmitter, where the second combining matrix projects all cross channels from the first transmitter to the $d_2$ predetermined vectors to reduce or eliminate interference from the first transmitter.

An embodiment is directed to a computer program on a computer-readable non-transitory storage medium embodying program instructions for aligning interference and receiving signals over first and second channels from first and second transmitters each having M transmit antennas by: estimating first and second channel matrices for first and second channels from first and second transmitters having M transmit antennas to a receiver having K receive antennas for receiving one or more signals over either or both of the first and second channels, determining a first rank $d_1$ and a second rank $d_2$ for a first signal and second signal received over the first and second channels, respectively, selecting $d_1$ predetermined vectors from a set of predetermined vectors having size M, where the set of predetermined vectors is known by the first and second transmitters and computing a first combining matrix as a product of an Hermitian of the $d_1$ predetermined vectors and an inverse of the second channel matrix, selecting $d_2$ predetermined vectors from the set of predetermined vectors and computing a second combining matrix as a product of an Hermitian of the $d_2$ predetermined vectors and an inverse of the first channel matrix, applying the first combining matrix to decode rank $d_1$ data signals received at the receiver from the first transmitter to project interference from the second transmitter to an Hermitian of the $d_1$ predetermined vectors to reduce or eliminate interference from the second transmitter, and applying the second combining matrix to decode rank $d_2$ data signals received at the receiver from the second transmitter to project interference from the first transmitter to an Hermitian of the $d_2$ predetermined vectors to reduce or eliminate interference from the first transmitter.

An embodiment is directed to a method for selecting and scheduling a plurality of receivers having K receive antennas to receive one or more data streams from a first transmitter having M transmit antennas where one or more of the plurality of receivers is configured to receive one or more data streams from a second transmitter having M transmit antennas, comprising: obtaining a first maximum rank measure $d_1^{max}$ identifying a maximum rank value for any signal to be sent by the first transmitter to the plurality of receivers, obtaining a second maximum rank measure $d_2^{max}$ identifying a maximum rank value for any signal to be sent by the second transmitter, assembling at the first transmitter a channel direction information (CDI) value and a channel quality information (CQI) value for each data stream to be sent to each of the plurality of receivers, where the CDI and CQI values associated with a data stream at a receiver are each derived from at least an equivalent channel matrix for the first transmitter that is computed from one or more predetermined vectors having size M which are applied to project all cross channels from the second transmitter to the one or more predetermined vectors to reduce or eliminate interference from the second transmitter, selecting a first receiver from the plurality of receivers by computing a weighted CQI value for each data stream and choosing a receiver having the largest weighted CQI value, and sequentially selecting one or more additional receivers from the plurality of receivers by computing a measure of orthogonality with respect to any previously selected receiver that is derived from at least the CDI values and choosing a receiver having the largest measure of orthogonality with respect to any previously selected receiver until a summation of rank signal for the selected receivers exceeds $M-d_2^{max}$.

A method, system and device are disclosed for providing mixed rank downlink compound multi-user interference alignment in a wireless network with a low-complexity scheme without requiring perfect global channel knowledge and the attendant overhead to achieve good performance between two interfering transmitters, each serving the maximum possible number of mixed rank receivers simultaneously, while only requiring local channel knowledge at nodes. In selected embodiments, the disclosed interference alignment scheme is provided for downlink (DL) multi-user, multiple input, multiple output (MU-MIMO) transmissions between two interfering transmitters in a wireless network where each transmitter obtains its own effective channel knowledge to each receiver, and where each receiver only needs the channel knowledge from itself to both transmitters and may receive more than one or more streams of data from either or both transmitters. In the wireless network, two transmitters $TX_1$, $TX_2$ (e.g., Macro eNB, relay node (RN), Micro eNB, etc.) are each equipped with M antennas to serve L receivers (e.g., user equipment (UE)) out of a total of N receivers at a given time, where each transmitter knows the effective channels from itself to each of the receivers. Each receiver is equipped with K antennas and is positioned to potentially receive mixed rank signals from two transmitters using the same time slot and frequency band. Thus, the $j^{th}$ receiver (j=1, . . . , L) receives a rank $d_j^1$ transmission from a first transmitter TX1 and receives a rank $d_j^2$ transmission from the second transmitter TX2 for a total transmission rank of $d_j^1+d_j^2$. If the $j^{th}$ receiver does not receive a transmission from the $i^{th}$ transmitter (i=1,2), then $d_j^i=0$. Each receiver in cell i (served by transmitter $TX_i$) may receive a mixed rank transmission from either or both transmitters and uses an indexed list of linearly independent, predetermined vectors $v_{ref}=\{v_{ref}^1, \ldots, v_{ref}^M\}$ and channel knowledge $H_1$, $H_2$ from each transmitter to i) compute combining vectors for each transmitter $TX_i$ to convert the cross channel interference from the other transmitter to a predetermined sub-space consisting of one or more vector(s) from the vector set $v_{ref}$ to leave more interference-free sub-space for signal transmission in its affiliated transmitter, and ii) compute, for each transmitter, equivalent channel matrix information $H_{i,j}^{eq}$ which is then fed back or otherwise acquired by transmitter $TX_i$. With this information, each transmitter selects $L_i$ receivers and constructs a transmitted signal by applying a selected precoding matrix $V_i$ to the data symbols $s_i$ to be transmitted where $V_i$ includes a number of columns in the inverse of the matrix $P_i$. Separate example scenarios are described to cover the case where the number of receiver antennas is greater than or equal to the number of transmitter antennas (e.g. K≥M) and where the number of transmitter antennas is greater than the number of receiver antennas (e.g. K<M).

Various illustrative embodiments of the present disclosure will now be described in detail with reference to the accompanying figures. While various details are set forth in the following description, it will be appreciated that the present disclosure may be practiced without these specific details, and that numerous implementation-specific decisions may be made to the disclosure described herein to achieve the device designer's specific goals, such as compliance with communication system limits or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present disclosure. Some portions of the detailed descriptions provided herein are presented in terms of algorithms and instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that, throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As used herein, the terms mobile wireless communication device and user equipment (UE) are used interchangeably to refer to wireless devices such as pagers, cellular phones, cellular smart-phones, wireless organizers, personal digital assistants, wireless Internet appliances, data communication devices, data messaging devices, computers, handheld or laptop computers, handheld wireless communication devices, wirelessly enabled notebook computers, mobile telephones, set-top boxes, network nodes, and similar devices that have wireless telecommunications capabilities. In wireless telecommunications systems, transmission equipment in a base station or access point transmits signals throughout a geographical region known as a cell. As technology has evolved, more advanced equipment has been introduced that can provide services that were not possible previously, including but not limited to enhanced node B (eNB) devices rather than a base station or other systems and devices that are more highly evolved than the equivalent equipment in a traditional wireless telecommunications system. Examples of such advanced or next generation equipment include, but are not limited to, LTE equipment or LTE-Advanced (LTE-A) equipment, and a packet-based network that uses such equipment can be referred to as an evolved packet system (EPS). As used herein, the terms access device or access point refer interchangeably to any component that can provide a UE with access to other components in a telecommunications system, including but not limited to a traditional base station or an LTE or LTE-A access device. An access point provides radio access to one or more UEs using a packet scheduler to dynamically schedule downlink traffic data packet transmissions and allocate uplink traffic data packet transmission resources among all the UEs communicating to the access device. The functions of the scheduler include, among others, dividing the available air interface capacity between UEs, deciding the transport channel to be used for each UE's packet data transmissions, and monitoring packet allocation and system load. The scheduler dynamically allocates resources for Physical Downlink Shared CHannel (PDSCH) and Physical Uplink Shared CHannel (PUSCH) data transmissions, and sends scheduling information to the UEs through a control channel.

Referring now to FIG. 1, there is shown a schematic diagram depiction of a communication system 100 in which there is mixed rank downlink compound multi-user interference alignment implemented for signal transmissions from transmitters 2, 6 to receivers 3-5, 7-9 in accordance with selected embodiments of the present disclosure. In the depicted embodiment, each of the transmitters $TX_1$ and $TX_2$ (e.g., eNBs) is equipped with M antennas and configured to transmit signals to receivers (e.g., UEs) which are each equipped with K antennas and configured to receive mixed rank signals. As will be appreciated, multiple dimensions can be generated by using subcarriers (in an OFDM system), antennas, or both, such that M=(# of subcarriers or # of time slots)×(# of Actual transmit antennas) and K=(# of subcarriers or # of time slots)×(# of Actual receive antennas). The area covered by transmitter $TX_i$ is referred to as cell i and the $j^{th}$ UE in cell i is referred to as UE (i,j). As shown, the transmitters $TX_1$ and $TX_2$ serve as many as L UEs (out of a total of N UEs) at a given time. Each transmitter $TX_i$ 2, 6 denotes a data transmission device such as a fixed base station, a mobile base station, Macro eNB, Relay Node, Micro eNB, a miniature or femto base station, a relay station, and the like. Each of the receiver nodes 3-5, 7-9 denotes a data reception device such as a relay station, a fixed terminal, a mobile terminal, user equipment and the like. In addition, the $j^{th}$ receiver node or UE (j=1, ..., L) in the $i^{th}$ cell is configured to receive a rank $d_j^i$ transmission, thereby enabling mixed rank signaling whereby the $j^{th}$ UE receives a rank $d_j^1$ transmission from transmitter $TX_1$ 2 and receives a rank $d_j^2$ transmission from transmitter $TX_2$ 6 (for a total transmission rank of $d_j^1+d_j^2$). If the $j^{th}$ UE does not receive a transmission from the $i^{th}$ transmitter (i=1,2), then $d_j^i=0$. In addition, there are $L_i$ UEs served in each cell i having a rank of at least one. In the illustrated example, $UE_1$ 3 receives a rank-one transmission from $TX_1$ and no transmission from $TX_2$; $UE_2$ 4 receives a rank-two transmission from TX and a rank-one transmission from $TX_2$; $UE_3$ 5 and $UE_{L-2}$ 7 each receive a rank-one transmissions from $TX_1$ and $TX_2$; $UE_{L-1}$ 8 receives rank-two transmissions from $TX_1$ and $TX_2$; and $UE_L$ 9 receives rank-two transmissions from $TX_2$. To characterize the mixed rank signaling, the maximum rank in each cell i is denoted by $d_{max}^i = \max_{j=1,\ldots,L} d_j^i$ and the total number of transmission rank for transmitter $TX_i$ is denoted by $D^i = \Sigma_{j=1}^L d_j^i$.

Depending on the transmission scheme used by the transmitters $TX_1$ and $TX_2$ and the location of the UEs, interference may occur at one or more of the receiver nodes 3-5, 7-9. For example, at the first receiver node $UE_1$, the desired signal from the first transmitter $TX_1$ arrives over direct channel $H_{1,1}$, while the potentially interfering signal from the second transmitter $TX_2$ arrives over channel $H_{2,1}$. Similarly, interference may occur in the other receiver nodes 4-5, 7-9 that decreases signal throughput of the network 100. To overcome the interference between transmitters $TX_1$ and $TX_2$ and allow for mixed rank downlink compound signaling from both transmitters to each receiver, an interference alignment scheme is proposed where each transmitter obtains its own channel state information (CSI) from each $UE_j$ (j=1, ..., L), and each UE only needs to know the channel between itself and each transmitter. In selected embodiments, the proposed interference alignment scheme uses a plurality of linearly independent vectors $v_{ref} = \{v_{ref}^1, \ldots, v_{ref}^M\}$ to construct a pair of combining vectors—one for each transmitter $TX_1$ and $TX_2$—at each of the UEs 3-5, 7-9, depending on the rank of the UE. Using the combining vectors, each UE (j=1, ..., L) projects all cross channels from an interfering transmitter to a predetermined sub-space span $\{(v_{ref}^l)^H\}$ for l=1, ..., $d_j^i$, thereby eliminating inter-cell interference if each transmitter sends its signal in the null space of the predetermined vectors $(v_{ref}^l)^H$ for l=1, ..., $d_j^i$. For example, each rank-one UE computes a combining vector from the first vector $v_{ref}^1$ and the inverse of the cross channel, while a rank-two UE computes two combining vectors from the first two vectors, $v_{ref}^1$ and $v_{ref}^2$ and the inverse of the cross channel, and so on. In addition, each transmitter uses channel quality information (CQI) and equivalent direct channel matrix information $H_{i,j}^{eq}$ for selected UEs to perform link adaptation and to precode data with a precoding matrix $V_i$ to cancel out both the intra-cell and inter-cell interference. In this way, interference alignment is performed at the UEs by using the combining vector to convert the cross channel to the predetermined sub-spaces. The result is indicated at the first receiver node 7 in the second cell (denoted $UE_{L-2}$) where the desired signal from the second transmitter $TX_2$ is received over direct channel $H_{2,L-2}$ by applying a first combining vector $r_{1,L-2}^l = (v_{ref}^l)^H H_{1,L-2}^+$ which effectively aligns the interfering signal $H_{1,L-2}$ from the first transmitter $TX_1$ to $(v_{ref}^l)^H$, when detecting the signal from the second transmitter $TX_2$. In addition, the first receiver node 7 (denoted $UE_{L-2}$) can also receive a second desired signal from the first transmitter $TX_1$ over direct channel $H_{1,L-2}$ by applying a second combining vector $r_{2,L-2}^l = (v_{ref}^l)^H H_{2,L-2}^+$ which effectively aligns the interfering signal $H_{2,L-2}$ from the second transmitter $TX_2$ to $(v_{ref}^l)^H$, when detecting the signal from the second transmitter $TX_1$.

Interference Alignment for Case K≥M

As disclosed herein, the mixed rank downlink compound multi-user interference alignment schemes can be used to serve L UEs with two transmitters $TX_i$ (i=1, 2) in cases where the number of receive antennas on the UEs is greater than or equal to the number of transmit antennas on the $i^{th}$ transmitters (e.g. K≥M) since all potentially interfering cross channels are invertible with a probability of almost one in a multipath rich propagation environment. In this case, each transmitter $TX_i$ is configured to select $L_i$ users having at least rank-one signaling in the $i^{th}$ cell (i=1,2) from a total of $N_i$ users, where $N_i$ is large enough to give the transmitters enough flexibility for pairing. In each cell, the transmitter $TX_i$ selects the UEs and their corresponding ranks $d_j^i$ such that, for each transmitter $TX_i$, its number of antennas (M) should not be less than the sum of the total number of transmission rank for its users ($D^i$) and the maximum rank $d_{max}^{3-i}$ provided by the other transmitter ($TX_{3-i}$), i.e. M≥$D^i + d_{max}^{3-i}$. Also, the channel from the $i^{th}$ transmitter (i=1, 2) to the $j^{th}$ UE is denoted by the K×M matrices $H_{i,j}$. As a result, the received signal at the $j^{th}$ UE of cell i can be written as $$y_j = H_{1,j}x_1 + H_{2,j}x_2 + n_j, \quad (1)$$

where the received signal $y_j$ contains a rank $d_j^i$ transmission from the $i^{th}$ transmitter, where $n_j$ is the noise at the $j^{th}$ UE, and where $x_i$ denotes the transmitted signal from the $i^{th}$ transmitter, i=1, 2. Both the channels $H_{1,j}$ and $H_{2,j}$ can be estimated at the $j^{th}$ UE using any desired technique, such as downlink pilot or reference signaling.

In this case where the number of UE receive antennas meets or exceeds the number of transmit antennas (K≥M), all channels $H_{i,j}$ are invertible with a probability of almost one in a multipath rich wireless propagation environment, meaning that the pseudo inverse of the channel $H_{i,j}$ is given by $H_{i,j}^+ = (H_{i,j}^H H_{i,j})^{-1} H_{i,j}^H$, such that $H_{i,j}^+ H_{i,j} = I$ where I denotes the identity matrix. As a result, each channel $H_{i,j}$ can be projected to a predetermined vector of size M, $v_{ref}$, in the case of single rank transmission by having each $UE_{i,j}$ compute a combining vector $r_{i,j} = v_{ref}^H H_{3-i,j}^+$ and feed back an equivalent direct transmission channel vector $h_{i,j}^{eq} = v_{ref}^H H_{3-i,j}^+ H_{i,j}$. However, to account for mixed rank signaling, each of the UEs and transmitters stores an "indexed" list of linearly independent vectors $v_{ref} = \{v_{ref}^1, \ldots, v_{ref}^M\}$, where $v_{ref}^l$ is an M×1 vector. In some embodiments, $v_{ref}$ consists of orthogonal vectors. Alternatively, $v_{ref}$ can be considered as a set of basis vectors for the M-dimensional transmission space. While the indexed list of $v_{ref}$ may be predefined and known to all UEs and both transmitters, it is also contemplated that each cell may have a different set of $v_{ref}$ vectors or there could be multiple sets of $v_{ref}$ vectors which would allow the transmitters to select or negotiate the vector that is better for their service and signal to all UEs (and probably the other transmitter). However, by using the same vector sets in both cells, system operation is simplified by eliminating any requirement of exchanging or signaling different vector sets between cells.

If the $y_j$ signal received at each $UE_{i,j}$ (Equation (1)) is processed by separately applying a first combining vector $(r_{1,j}^l = (v_{ref}^l)^H H_{2,j}^+)$ for $l=1, \ldots, d_j^1$) and a second combining vector $(r_{2,j}^l = (v_{ref}^l)^H H_{1,j}^+$ for $l=1, \ldots, d_j^2$), the result is:

$$\tilde{y}_{j,1}^l = (v_{ref}^l)^H H_{2,j}^+ y_j = h_{1,j}^{l,eq} x_1 + (v_{ref}^l)^H x_2 + n_{j,1}^{l,eq}, \\ j=1, \ldots, L \; l=1, \ldots, d_j^1 \quad (2)$$

$$\tilde{y}_{j,2}^l = (v_{ref}^l)^H H_{1,j}^+ y_j = (v_{ref}^l)^H x_1 + h_{2,j}^{l,eq} x_2 + n_{j,2}^{l,eq}, \\ j=1, \ldots, L \; l=1, \ldots, d_j^2 \quad (3)$$

where the equivalent transmission channel matrix to the first transmitter $TX_1$ is $h_{1,j}^{l,eq} = (v_{ref}^l)^H H_{2,j}^+ H_{1,j}$, where the equivalent noise term from the first transmitter is $n_{j,1}^{l,eq} = v_{ref}^l)^H H_{2,j}^+ n_j$, where the equivalent transmission channel matrix to the second transmitter $TX_2$ is $h_{2,j}^{l,eq} = (v_{ref}^l)^H H_{1,j}^+ H_{2,j}$, and where the equivalent noise term from the second transmitter is $n_{j,2}^{l,eq} = (v_{ref}^l)^H H_{1,j}^+ n_j$. Thus, Equations (2) and (3) represent matching filter equations for $d_j^1$ and $d_j^2$ independent or orthogonal vectors $v_{ref}^l$ applied to process the received $y_j$ signal to extract signals from the first and second transmitters, respectively.

Considering Equations (2) and (3) for all $i=1,2; j=1, \ldots, L; l=1, \ldots, d_j^i$, the transmitted signal $x_1$ should be designed in the null space of $v_{ref}^l$ for $l=1, \ldots, d_j^1$ (the first $d_j^1$ vectors in the set $v_{ref}$) in order to cancel the inter-cell interference from the second transmitter. In addition, the transmitted signal $x_2$ should be designed in the null space of $v_{ref}^l$ for $l=1, \ldots, d_j^2$ (the first $d_j^2$ vectors in the set $v_{ref}$) in order to cancel the inter-cell interference from the second transmitter. By satisfying these constraints in designing the transmit signals $x_i$ and by applying the matched filters of $(v_{ref}^l)^H H_{3-i,j}^+$ ($i=1,2$), for the $j^{th}$ UE ($j=1, \ldots, L_i$), the received signals appears as $$\tilde{y}_{j,1}^l = h_{1,j}^{l,eq} x_1 + n_{j,1}^{l,eq}, j=1, \ldots, L \; l=1, \ldots, d_j^1 \quad (4)$$

$$\tilde{y}_{j,2}^l = h_{2,j}^{l,eq} x_2 + n_{j,2}^{l,eq}, j=1, \ldots, L \; l=1, \ldots, d_j^2 \quad (5)$$

As seen from Equations (4) and (5), all interference from the second transmitter ($TX_2$) to the $j^{th}$ UE in the first cell is aligned such that each UE in the first cell can decode a signal of rank $d_j^1$. In other words, when UE decodes a signal of rank $d_j^1$ from the first cell, the signal from the second transmitter is considered as interference. Similarly, all interference from the first transmitter ($TX_1$) to the $j^{th}$ UE in the second cell is aligned such that each UE in the second cell can decode a signal of rank $d_j^2$ (again, when UE decodes a signal of rank $d_j^2$ from the second cell, the signal from the first transmitter is considered as interference). With this approach, there is a probability of almost one that the vectors in $\{h_{1,j}^{l,eq}\}_{l=1}^{d_{j1}}$ and $\{h_{2,j}^{l,eq}\}_{l=1}^{d_{j2}}$ are all linearly independent. Since the $j^{th}$ UE at cell i requires a transmission of rank $d_j^i$, to accommodate the largest rank from either transmitters ($\max\{d_j^1, d_j^2\}$), the indexed vector set $v_{ref}$ at the $j^{th}$ UE must have at least $\max\{d_j^1,$ $d_j^2\}$, independent vectors $v_{ref}^l$ to achieve a multiplexing gain of $d_j^i$ from the $i^{th}$ transmitter. On the other hand, the $i^{th}$ transmitter should provide total $D^i$ degrees of freedom for its users. This requires that the $i^{th}$ transmitter should have at least $D^i + d_{max}^{3-i}$ antennas.

With this scheme, in each cell, the problem is reduced to DL MU-MIMO with the equivalent channel $$H_{i,j}^{eq} = \left[ h_{i,j}^{1,eq T} \; \ldots \; h_{i,j}^{d_j,eq T} \right]^T, \quad (6)$$

where $h_{i,j}^{l,eq} = (v_{ref}^l)^H H_{3-i,j}^+ H_{i,j}$ for the $j^{th}$ UE ($j=1, \ldots, L$) with $d_{max}^{3-i}$ dimensions reserved for interference alignment. As a result, each UE j estimates its channels to the transmitters and then feeds back the equivalent direct transmission channel matrices $H_{1,j}^{eq}$ and $H_{2,j}^{eq}$ to each transmitter $TX_i$, either directly or with an indication of the matrix or of its vectors using code-book based or non-code-book based techniques. Alternatively, each transmitter $TX_i$ operating in time division duplexing (TDD) mode can estimate $h_{i,j}^{l,eq}$ from the uplink channel if the $UE_{i,j}$ sends multiple pilot signals in the direction of the transpose of the combining vector $(r_{i,j}^l)^T$, where $(.)^T$ denotes the transpose operation.

Once the transmitter $TX_i$ acquires the equivalent direct transmission channel matrices $H_{i,j}^{eq}$ from all UEs, transmitter $TX_i$ selects $L_i$ UEs indexed by $(s_1, \ldots, s_{L_i})$ and constructs the transmitted signal $x_i$ using any desired DL-MU-MIMO technique, such as zero-forcing or dirty paper coding (DPC).

In an illustrative example where zero-forcing precoding is used, the $i^{th}$ transmitter (for $i=1,2$) may be configured to construct the transmitted signal $x_i$ using a precoding matrix $V_i$ formed with the first $D^i$ columns in the inverse of the matrix $P_i$ of dimension $(D^i + d_{max}^{3-i}) \times M$, where $$P_i = \begin{bmatrix} H_{i,1}^{eq} \\ \vdots \\ H_{i,L_i}^{eq} \\ v_{ref}^{1T} \\ \vdots \\ v_{ref}^{d_{max}^{3-i}T} \end{bmatrix} \quad (7)$$

The resulting transmitted signal is:

$$x_i = V_i s_i \quad (8)$$

In Equation (8), $V_i = [v_{i,1} \ldots v_{i,L_i}]$ is the first $D^i$ columns of the matrix $P_i^+ = P_i^H (P_i P_i^H)^{-1}$, where $v_{i,j}$ is the precoding matrix of size $M \times d_j^i$ for the $j^{th}$ selected user in the cell i in which the $l^{th}$ column ($l=1, \ldots, d_j^i$) of this matrix is denoted by $v_{i,j}^l$. In addition, $s_{i,j} = [s_{i,1} \ldots s_{i,L_i}]$ represents data symbols to be transmitted at the $i^{th}$ transmitter and $s_{i,j}$ is a vector of size $d_j^i \times 1$ representing a rank-$d_j^i$ signal that should be transmitted to the selected user j in cell i. With this precoding scheme, inter-cell and intra-cell interference are cancelled and the $j^{th}$ UE ($j=1, \ldots, L$) can decode its $l^{th}$ data stream from the $i^{th}$ transmitter ($i=1,2$) using single-user detection algorithms using $$\tilde{y}_{j,i}^l = h_{i,j}^{l,eq} v_{i,j}^l s_{i,j}^l + n_{j,i}^{l,eq}, \quad (9)$$

where $s_{i,j}^l$ denotes the $l^{th}$ data stream sent to the $j^{th}$ UE from the transmitter and $h_{i,j}^{l,eq} v_{i,j}^l$ can be considered as the equivalent channel for the $l^{th}$ stream of $j^{th}$ UE from the $i^{th}$ transmitter. Each UE can calculate the required equivalent channels using reference signals, such as specified, for example, in 3GPP Release 8 LTE, or the choice of precoding matrix/vector can be signaled to the UE.

The interference alignment schemes disclosed herein may be considered as an improved MU-MIMO technique. Some feedback schemes that exist for MU-MIMO scenarios can be used here. For example, in addition to feeding back equivalent direct channel matrix information $H_{i,j}^{eq}$, each $UE_{i,j}$ may feed back additional information to its affiliated transmitter, such as LTE Release 8 Rank Indicator (RI), Channel Quality Indicator (CQI), or redefined CQI for MU-MIMO in LTE-A, which is used by the transmitter $TX_i$ for scheduling and link adaptation. One example would be to have each UE feed back a threshold, such as the effective noise power (e.g., $E\{\|n_{j,i}^{eq}\|^2\}$) or its inverse $$\left(e.g., \frac{1}{E\{\|n_{j,i}^{eq}\|^2\}}\right),$$

where $$n_{j,i}^{eq} = \left[n_{j,i}^{1,eq} \dots n_{j,i}^{d_j^i,eq}\right]$$

and where $E\{.\}$ denotes the expectation. Also, in the $i^{th}$ cell (i=1,2), rank indicator (RI) information (or equivalently $d_j^i$) can be estimated and reported back to the transmitter by UE j=1, ..., L. Therefore, according to RI, each UE could send multiple CQIs for each one of RI data streams based on the effective received SNR. With this information, transmitters can perform scheduling, pairing, and link adaptation for the selected UEs by calculating the effective SNR for each one of RI data streams. In one embodiment, the effective SNR for each one of RI data streams can be calculated as $$SNR_{j,i}^l = \frac{P_i \|h_{i,j}^{l,eq} v_{i,j}^l\|^2}{D^i E\{|n_{j,i}^{l,eq}|^2\}}, \tag{10}$$

where $P_i$ is the transmitted total power for transmitter i, $D^i$ is total number of layers transmitted by transmitter i, and the power is equally divided to each layer. While the additional RI information may be fed back to the transmitter, it will be appreciated that the transmitter can decide on the RI and use this information for scheduling, pairing, and link adaptation.

In support of UE scheduling, each UE can measure and estimate the direct channel to the serving transmitter. Using the same procedure as 3 GPP LTE release 8 or 10, each UE determines the rank of the channel, $d_j^i$. This rank determines that the UE can receive a signal up to rank $d_j^i$ from transmitter i. Each UE can also report back $d_j^i$ as RI information and multiple CQI for each one of $d_j^i$ data streams. As part of scheduling operations, each transmitter selects different UEs with rank $d_j^i$. Transmitter i can also assign $d_j^i$ to UE j. It could assign this value considering other UEs in the cell and UE's transmission status.

According to CQI and RI (equivalently $d_j^i$) for different users, the $i^{th}$ transmitter can schedule users such that the number of transmit antennas is not less than the sum of data streams provided to the users and the reserved data ranks for interference, i.e. $M \geq D^i + d_{max}^{3-i}$, where $D^i$ is the degrees of freedom that the $i^{th}$ transmitter provides for its users. In this case, each transmitter should know the maximum rank that the other transmitter is providing to users (i.e., $d_{max}^{3-i}$). This information can be exchanged between transmitters or there can be a pre-defined setting that transmitters follow. In one embodiment, they can agree on a pre-defined value, i.e. $d_{max}^1 = d_{max}^2$.

By having each $UE_{i,j}$ compute and apply a first combining vector $(r_{1,j}^l = (v_{ref}^l)^H H_{2,j}^+)$ for $l=1, \ldots, d_j^1$) and a second combining vector $(r_{2,j}^l = (v_{ref}^l)^H H_{1,j}^+)$ for $l=1, \ldots, d_j^2$), any interfering cross channels from the first transmitter ($TX_1$) and second transmitter ($TX_2$) are respectively projected to the respective predetermined subspace span $\{(v_{ref}^l)^H\}$, thereby allowing a UE to decode a data streams sent by both transmitters using precoding matrix $V^i$ (from Equation (8)).

Figure 2:
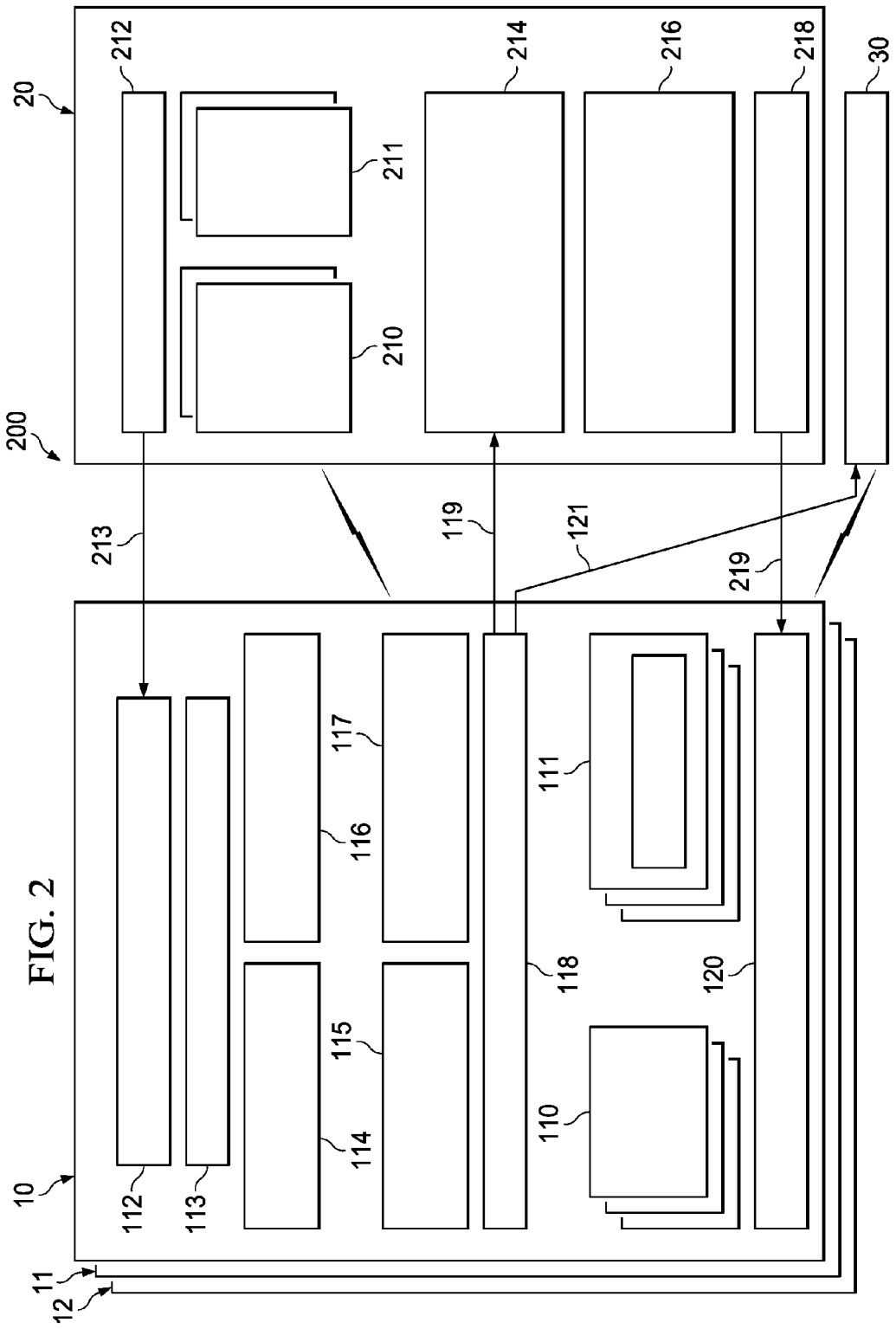
FIG. 2 is a schematic diagram showing components of a communication system which provides mixed rank downlink compound multi-user interference alignment between two interfering transmitters in which the receivers may receive signals from only one transmitter or both transmitters such that when decoding the signal from one transmitter, the channel from the other transmitter to each receiver is aligned to a predetermined set of reference vectors at each receiver.

To understand how a plurality of linearly independent reference vectors $(v_{ref}^l)^H$ may be used to align interference in the network 100, reference is now made to FIG. 2 which schematically depicts a communication system 200 which provides mixed rank downlink compound multi-user interference alignment between two access devices 20, which may each transmit signals to one or more mixed rank user equipment (UE) devices 10-12 such that all crossed channels from the transmitters are aligned to the predetermined sub-spaces at each receiver. To this end, each of the UEs 10-12 is configured to determine, for each transmitter, a rank indicator, and to compute therefrom corresponding equivalent channel matrix information $H_{i,j}^{eq}$ from a plurality of linearly independent reference vectors $(v_{ref}^l)^H$. After feeding back the equivalent direct channel matrix information $H_{i,j}^{eq}$ to the access devices 20, 30, each access device 20, 30 constructs its transmission signal $x_i$ by precoding the transmit data in the null space of $(v_{ref}^l)^H$ so that no interference is imposed to the UEs in the other cell. For purposes of transforming the transmit data and signals as described herein, the UE 10 includes, among other components, one or more processors 110 that run one or more software programs or modules embodied in circuitry and/or non-transitory storage media device(s) 111 (e.g., RAM, ROM, flash memory, etc.) to communicate to receive data from, and to provide data to, access devices 20, 30. When data is transmitted from UE 10 to access device 20, the data is referred to as uplink data and when data is transmitted from access device 20 to UE 10, the data is referred to as downlink data.

As part of the MIMO downlink process, the UE 10 determines, quantifies or estimates the channel matrices $H_1$ and $H_2$ which respectively represent the channel gain between the first access device 20 and second access device 30 and the UE. For example, the channel matrix $H_1$ can be represented by a K×M matrix of complex coefficients, where M is the number of transmit antennas in the first access device 20 and K is the number of receive antennas in the UE 10. Alternatively, the channel matrix $H_1$ can instead be represented by an M×K matrix of complex coefficients, in which case the matrix manipulation algorithms are adjusted accordingly. The coefficients of the channel matrix $H_1$ depend, at least in part, on the transmission characteristics of the medium, such as air, through which a signal is transmitted. A variety of methods may be used at the receiver to determine the channel matrix $H_1$ and $H_2$ coefficients, such as transmitting a known pilot signal to a receiver so that the receiver, knowing the pilot signal, can estimate the coefficients of the channel matrix $H_1$ and $H_2$ using well-known pilot estimation techniques. Alternatively, when the channel between the transmitter and receiver are reciprocal in both directions, the actual channel matrix $H_1$ is known to the receiver and may also be known to the transmitter. To this end, each access device (e.g., 20) may include a pilot signal generator (e.g., 212) for generating and transmitting a pilot signal 213. In addition, each UE 10 may include a channel estimation module 112 using hardware and/or software executed by one or more processor elements to determine or estimate the channel matrices $H_1$ and $H_2$ from the access devices 20, 30.

At the UE 10, a rank computation module 113 is provided for computing or determining a rank indicator (RI or equivalently $d^i$) for each potential transmission from the access devices 20, 30. In addition, the UE 10 includes one or more combining vector computation modules for computing or retrieving first and second combining vectors $r_1^l$ and $r_2^l$ to be used for receiving signals from the access devices 20, 30. In the cases where the UE antenna count K is at least equal to the access device antenna count M, the estimated channel matrices $H_1$ and $H_2$ to access devices 20, 30 may be used to compute the first and second combining vectors $r_1^l$ and $r_2^l$, respectively. For example, a first combining vector computation module 114 may be provided for computing the pseudo inverse of the estimated channel matrix $H_1$, or $H_1^+$. Next, an arbitrary set of linearly independent reference vectors $v_{ref} = \{v_{ref}^1, \ldots, v_{ref}^M\}$, each of size M, is defined or obtained, where the reference vector set $v_{ref}$ is known to all UEs and transmitters because it was signaled or pre-determined. In one embodiment, $v_{ref}$ consists of orthogonal reference vectors are stored in memory 111. Assuming a signal of rank-d should be received by UE 10, after determining the Hermitian transpose of $d^1$ reference vectors from the reference vector set, $(v_{ref}^l)^H$ for $l=1, \ldots, d^1$, the first combining vector computation module 114 then computes the combining vector $r_1^l = (v_{ref}^l)^H H_2^+$ for $l=1, \ldots, d^1$. In similar fashion, a second combining vector computation module 115 may be provided for using the estimated channel matrix $H_2$ to compute the second combining vector $r_2^l = (v_{ref}^l)^H H_1^+$ for $l=1, \ldots, d^2$.

The UE 10 also includes one or more equivalent channel matrix computation modules which multiply the combining vector $r_i^l$ and estimated direct channel matrix $H_i$ to compute the equivalent channel matrix $H_i^{eq}$ where its $l^{th}$ row (the equivalent channel matrix for each data stream) is calculated by $h_i^{l,eq} = r_i^l H_i = (v_{ref}^l)^H H_{3-i}^+ H_i$. For example, a first equivalent channel matrix computation module 116 may be provided for computing $h_1^{l,eq} = (v_{ref}^l)^H H_2^+ H_1$, and a second equivalent channel matrix computation module 117 may be provided for computing $h_2^{l,eq} = (v_{ref}^l)^H H_1^+ H_2$. The UE 10 may feed back the equivalent channel matrices $H_1^{eq}$ and $H_2^{eq}$ to each of the access points 20, 30, which also receive equivalent channel matrix information from the other affiliated UEs 11, 12. In selected embodiments, the feedback module 118 sends the equivalent channel matrices $H_1^{eq}$ and $H_2^{eq}$ with uplink messages 119, 121. Alternatively, when TDD mode is used, each access point can estimate the equivalent channel matrix $H_{i,j}^{eq}$ from the uplink channels if the UE sends the multiple pilot signals in the direction of $(r_i^l)^T$. The feedback module 118 may also send RI and multiple CQI information (such as an indication of effective noise power) in the uplink messages 119, 121 to each access device 20, 30 based on the computed rank for each access device for use in scheduling and link adaptation.

At the access device 20, the acquired equivalent channel matrices $H_{i,j}^{eq}$ and RI/CQI information are processed and transformed by one or more processors 210 that run one or more software programs or modules embodied in circuitry and/or non-transitory storage media device(s) 211 (e.g., RAM, ROM, flash memory, etc.). For example, after receiving the equivalent channel matrices $H_{i,j}^{eq}$ and any RI or CQI information from all affiliated UEs 10-12, the access point 20 processes the feedback information to avoid any co-channel interference to non-affiliated UEs. To this end, a selection module 214 at the access point 20 uses the acquired equivalent channel matrices and any RI and CQI information to select a subset of $L_i$ UEs out of a total of $N_i$ UEs. The selected $L_i$ UEs are indexed by $(s_1, \ldots, s_{L_i})$. In addition, the access device 20 includes a precoding module 216 which uses the equivalent channel matrices to construct or precode a transmit signal $x_i = V_i s_i$, where $V_i$ denotes the precoding matrix for the ith transmitter or access device and $s_i$ represents data symbols to be transmitted at the ith transmitter or access device. In particular, the precoding module 216 may compute the precoding matrix $V_i$ by computing matrix P, computing the matrix $P^+$, and then selecting the first $D^i$ columns of the inverse matrix $P^+$, where $D^i$ is the total number of transmission rank ($D^i = \Sigma_{j=1}^{L} d_j^i$). Assuming zero-forcing precoding, the access device 20 may be configured as the ith transmitter to compute matrix P of dimension $(D^i + d_{max}^{3-i}) \times M$, as $$P_i = \begin{bmatrix} H_{i,1}^{eq} \\ \vdots \\ H_{i,L_i}^{eq} \\ v_{ref}^{1T} \\ \vdots \\ v_{ref}^{d_{max}^{3-i}T} \end{bmatrix},$$

followed by computation of the inverse matrix $P_i^+ = P_i^H (P_i P_i^H)^{-1}$, followed by the selection of the first $D^i$ columns of matrix $P_i^+$ to form the precoding matrix $V_i = [v_{i,1} \ldots v_{i,L_i}]$, where $v_{i,j}$ is the precoding matrix of size $M \times d_j^i$ for the $j^{th}$ user with the $l^{th}$ column ($l=1, \ldots, d_j^i$) of this matrix denoted by $v_{i,j}^l$. Though not shown, there may also be scheduling and link adaptation performed on the data symbols $s_i$ at the precoding module 216 or transmit module 218. As the precoded data $x_i$ is transmitted over a downlink message 219 to the UE 10, it is received at the decode module 120 by applying the first and second combining vectors $r_1^l$ and $r_2^l$ to appear as the received signals $\tilde{y}_{j,i}^l = h_{i,j}^{l,eq} v_{i,j}^l s_{i,j}^l + n_{j,i}^{l,eq}$ in which the inter-cell and intra-cell interference are cancelled. As a result, the UE 20 can decode data from the received signal $\tilde{y}_{j,i}^l$ using the first and second combining vectors $r_1^l$ and $r_2^l$ to implement single user detection algorithms.

Figure 3:
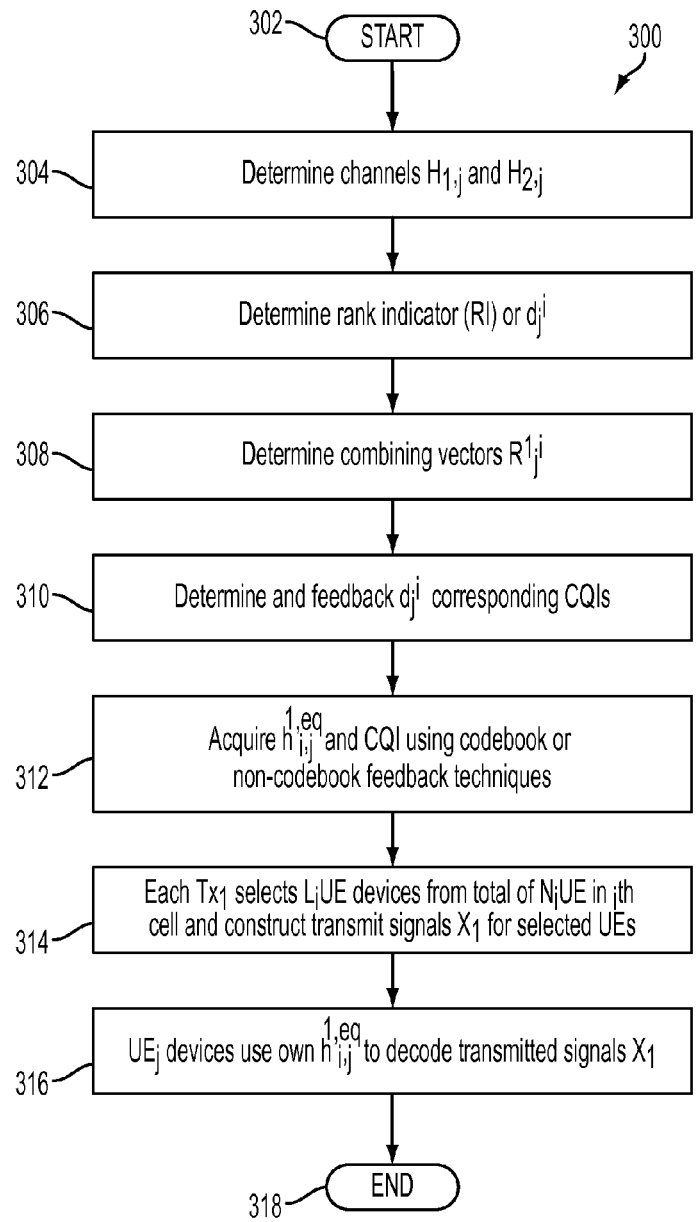
FIG. 3 is a flow chart illustrating a mixed rank downlink compound multi-user interference alignment process that may be performed when the number of receiver antennas equals or exceeds the number of transmitter antennas.

Referring now to FIG. 3, there is depicted in flow chart form a mixed rank downlink compound multi-user interference alignment process 300 that may be performed when the number of receiver antennas K equals or exceeds the number of transmitter antennas M. Once the procedure starts (step 302), each $UE_j$ device estimates or computes at (step 304) the channels $H_{1,j}$ and $H_{2,j}$ to the $UE_j$ device from potentially interfering transmitters $TX_1$ and $TX_2$. Channel information may be computed using pilot estimation techniques.

At step 306, each $UE_j$ device computes the rank indicator (RI) for each potential transmission stream from the ith transmitter. Alternatively, each $UE_j$ device computes $d_j^i$ for each potential transmission stream from the ith transmitter.

At step 308, each $UE_j$ device computes the first and second combining vectors $r_{i,j}^l$ for each stream received over the channels $H_{1,j}$ and $H_{2,j}$, such as by multiplying the Hermitian reflection of the shared reference vectors $v_{ref}^l$ (for $l=1, \ldots, d_j^i$) and the pseudo inverse of the channel $H_{3-i,j}^+$. The first and second combining vectors $r_{i,j}^l$ are then multiplied with the received signal to compute $\tilde{y}_{j,i}^l$ from Equations (2) and (3). In addition, each $UE_j$ device computes the equivalent direct channel vectors $h_{i,j}^{l,eq}$ based on the estimated direct channel $H_{i,j}$ and the computed combining vectors $r_{i,j}^l$.

At step 310, each $UE_j$ device computes and feeds back all the $d_j^i$ corresponding CQIs for each potential transmission stream from the ith transmitter.

At step 312, each transmitter $TX_i$ acquires the equivalent channel vector information $h_{i,j}^{l,eq}$ along with any channel quality indicator (CQI), either directly or indirectly using codebook or non-codebook feedback techniques by UEs or through uplink channel estimation and channel reciprocity. With this information, each transmitter $TX_i$ computes equivalent channel $$H_{i,j}^{eq} = \left[ h_{i,j}^{1,eq T} \ldots h_{i,j}^{d_j^i, eq T} \right]^T$$

for the affiliated UE devices.

At step 314, each transmitter $TX_i$ selects $L_i$ UE devices from a total of $N_i$ UE devices in the ith cell, and then constructs transmit signals $x_i$ for the selected UEs. In selected embodiments, the transmit signals $x_i$ are constructed using a precoding matrix technique (such as described at Equations (7) and (8)) and/or link adaptation technique (such as described herein)), and then transmitted as downlink data to the selected UEs. The transmit signals $x_i$ may be constructed as $x_i = V_i s_i$ where $V_i$ includes the first $D^i$ columns in the inverse of the matrix $P_i$.

At step 316, each $UE_j$ device uses its own equivalent channels $h_{i,j}^{l,eq}$ for $l=1, \ldots, d_j^i$, to decode its transmitted signals $x_i$ which appears as a receive signal vector $\tilde{y}_{j,i}^l = h_{i,j}^{l,eq} v_{i,j}^l s_{i,j}^l + n_{j,i}^{l,eq}$. In order to decode the receive signal vector, each $UE_j$ device may know or derive its own precoding vectors $v_{i,j}^l$. At step 318, the process ends.

Interference Alignment for Case K<M

In addition to the foregoing, selected embodiments may also implement the disclosed mixed rank downlink compound multi-user interference alignment schemes in cases where the number of antennas on the transmitters is greater than the number of receive antennas on the UE (e.g. K<M), provided that adjustments are made to match or correlate the channels $H_{i,j}$ with the predetermined vectors $(v_{ref}^l)^H$. The adjustments are required because the cross channels $H_{i,j}$ are not invertible in the case where the UE antenna count K is less than the access device antenna count M, and as a result, combining vectors $r_{i,j}^l$ (described above) cannot be used to match the equivalent cross channels perfectly to the predetermined vectors $(v_{ref}^l)^H$. To address this matching problem, a number of adjustment schemes may be used.

Euclidean Distance Minimization

In a first adjustment scheme, Euclidean Distance Minimization (EDM) techniques may be used to find or compute an EDM combining vector $r_{i,j}^l$ which minimizes the Euclidean distance of the equivalent interference channel $(r_{i,j}^l H_{i,j})$ for the $l^{th}$ data stream of each UE to $(v_{ref}^l)^H$. Referring to FIG. 2, the EDM technique may be implemented by the combining vector computation module 114 at each UE to compute the combining vector for the $l^{th}$ data stream to solve the optimization problem:

$$r_{i,j}^l = \underset{r}{\operatorname{argmin}} \; \|H_{3-i,j}^H r^H - v_{ref}^l\|^2 \quad (11)$$

$$\text{s.t.} \; \|H_{3-i,j}^H r^H\|^2 = 1,$$

One computation solution for computing the EDM combining vector is:

$$r_{i,j}^l = \frac{(v_{ref}^l)^H H_{3-i,j}^+}{\|(v_{ref}^l)^H H_{3-i,j}^+ H_{3-i,j}\|}. \quad (12)$$

where $H_{3-i,j}^+ = H_{3-i,j}^H (H_{3-i,j} H_{3-i,j}^H)^{-1}$ such that $H_{3-i,j}^+$ is defined such that $H_{3-i,j} H_{3-i,j}^+ = I$.

Once the EDM combining vector $r_{i,j}^l$ is computed, the equivalent direct channel matrix for each stream is computed as follows:

$$h_{i,j}^{l,eq} = \frac{(v_{ref}^l)^H H_{3-i,j}^+ H_{i,j}}{\|(v_{ref}^l)^H H_{3-i,j}^+ H_{3-i,j}\|}, \quad (13)$$

$$l = 1, \ldots, d_j^i.$$

The remaining processing at the UE 10 and access point 20 proceeds substantially as described with reference to steps 310-318 in the process 300 depicted in FIG. 3 except the fact that the calculation of CQI will be affected by the amount of inter-cell interference since the inter-cell interference cannot be cancelled completely. As a result, the computation of effective SNR at the transmitter for scheduling and link adaptation may be replaced by computing an effective signal to interference plus noise ratio (SINR) as follows:

The rest would be the same as in the case of K≥M and one can follow flow chart 1 for this embodiment. The only difference is the computation of effective SNR (it would be effective SINR in this case) or CQI calculations that can be changed to capture the inter-cell interference as follows:

$$SINR_{i,j}^{l,eff} = \frac{\frac{P_i}{D^i} |h_{i,j}^{l,eq} v_{i,j}^l|^2}{\frac{P_{3-i}}{M-1}(1 - |r_{i,j}^l H_{3-i,j} v_{ref}^l|^2) + E\{|n_{i,j}^{l,eq}|^2\}}, \quad (14)$$

where $P_{3-i}$ refers to interfering power from the "other" transmitter, $h_{i,j}^{l,eq}$ is defined in Equation (13), $r_{i,j}^l$ is obtained as in Equation (12), and $v_{i,j}^l$ is the precoding vector for the $l^{th}$ data stream of the UE (i,j). As a result of this adjustment, the CQI computation at the can be modified to capture the inter-cell interference term $$\frac{P_{3-i}}{M-1}(1 - |r_{i,j}^l H_{3-i,j} v_{ref}^l|^2).$$

Time/Frequency Extension

In a second adjustment scheme for cases where the number of antennas on the eNB is greater than the number of receive antennas on the UE (e.g. K<M), the interfering channels of UEs are extended in time or frequency domain such that the aggregate channel becomes invertible. For example, in OFDM systems like LTE or LTE-Advanced systems, the channels $H_{i,j}$ can be extended by using time/frequency resource elements. By extending the time/frequency of the channels $H_{i,j}$, each $UE_j$ device can compute and use the first and second combining vectors $r_{i,j}^l$ to match the extended cross channels $H_{i,j}$ to the predetermined vectors $(v_{ref}^l)^H$.

Figure 4:
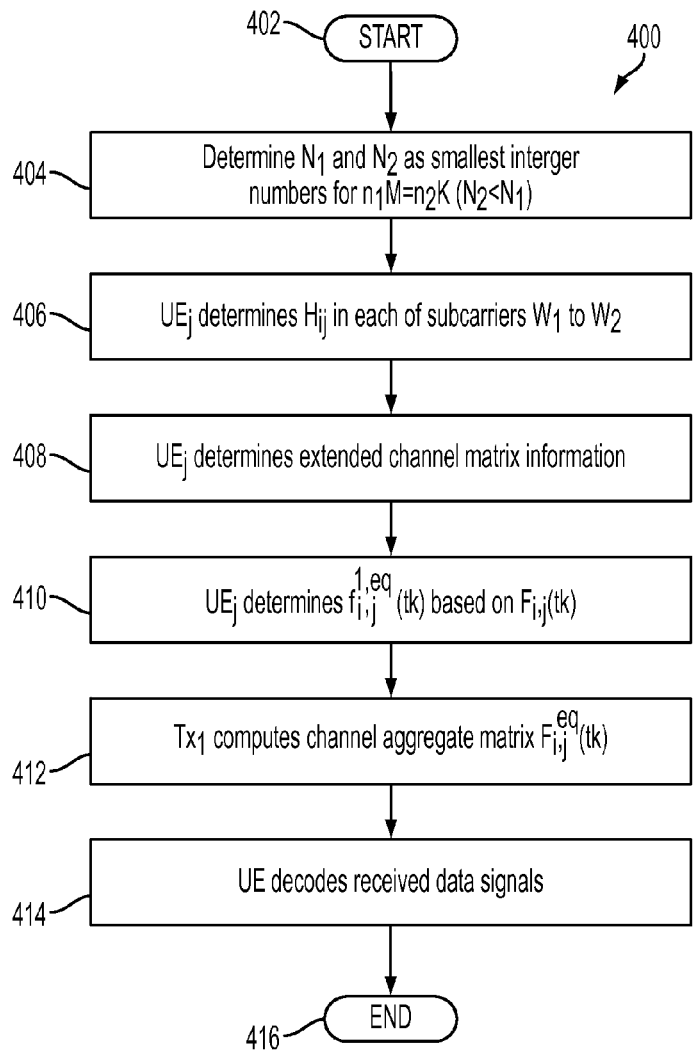
FIG. 4 is a flow chart illustrating a mixed rank downlink compound multi-user interference alignment process that may be performed to extend the interfering channels in frequency in cases when the number of transmitter antennas exceeds the number of receiver antennas.

To illustrate an example interference alignment process that may be performed to extend the interfering channels in frequency, reference is now made to FIG. 4 which depicts in flow chart form a mixed rank downlink compound multi-user interference alignment process 400 that may be performed in cases when the number of transmitter antennas M exceeds the number of receiver antennas K. Once the procedure starts (step 402), each $UE_j$ device effectively extends the interfering channels by finding or deriving n1 and n2 (at step 404) that are the smallest integer numbers such that:

$$n1M = n2K (n2 > n1). \qquad (15)$$

For example, if M=4 and K=2, then we have n1=1 and n2=2.

At step 406, each $UE_j$ device estimates or computes the channels $H_{i,j}$ in each of the subcarriers $w_1$ to $w_{n2}$ of the channels between the $UE_j$ device and potentially interfering transmitters $TX_1$ and $TX_2$. The channel estimation module 112 shown in FIG. 2 may be used here to implement pilot signal estimation or any other desired channel estimation technique.

At step 408, each $UE_j$ device computes extended channel matrix information. The combining vector computation module 114 shown in FIG. 2 may be used to compute the extended channel matrix information. To implement frequency extension, the channel of the channel of the $j^{th}$ UE to $TX_i$ in the subcarriers $w_1$ to $w_{n2}$ may be denoted as $\{H_{i,j}(w_k)\}_{k=1}^{n2}$, where it is understood that a subcarrier refers to a frequency unit or band. With this approach, the aggregate cross channel is defined as $$H_{i,j} \triangleq [H_{i,j}(w_1)^T | \ldots | H_{i,j}(w_{n2})^T]^T \qquad (16)$$

where $[.]^T$ denotes the transpose operation. From the foregoing, the size of $H_{i,j}$ is therefore $(Kn_2) \times M = (Mn_1) \times M$, and each channel $H_{i,j}$ may be represented as follows:

$$H_{i,j} = [F_{i,j}(t_1)^T | \ldots | F_{i,j}(t_{n1})^T]^T, \qquad (17)$$

in which $\{F_{i,j}(t_k)\}_{k=1}^{n1}$ are all square M×M matrices that are invertible with probability almost equal to one in a multipath rich frequency selective channel with tone separations larger than the coherence channel bandwidth.

With this transformation, the transmitted and received signals and noise vectors in the subcarriers $w_1, \ldots, w_{n2}$ can be transformed to:

$$x_i \triangleq [x_i(w_1)^T | \ldots | x_i(w_{n2})^T]^T = [q_i(t_1)^T | \ldots | q_i(t_{n1})^T]^T, \qquad (18)$$

$$y_j \triangleq [y_j(w_1)^T | \ldots | y_j(w_{n2})^T]^T = [z_j(t_1)^T | \ldots | z_j(t_{n1})^T]^T, \qquad (19)$$

$$n_j \triangleq [n_j(w_1)^T | \ldots | n_j(w_{n2})^T]^T = [w_j(t_1)^T | \ldots | w_j(t_{n1})^T]^T. \qquad (20)$$

To conclude step 408, each $UE_j$ device computes the channel matrix $F_{i,j}(t_k)$, i=1, 2 from Equation (17).

At step 410, each $UE_j$ device computes the equivalent channel vector $f_{i,j}^{l,eq}(t_k)$ for each $t_k$, k=1, ... n1 based on the channel matrix $F_{i,j}(t_k)$ for each data stream l=1, ..., $d_j^i$ assigned/requested for UE. In an example embodiment, each $UE_{jj}$ device computes the equivalent channel vector $f_{i,j}^{l,eq}(t_k)$ by first computing or deriving a combining vectors $r_{i,j}^l(t_k) = (v_{ref}^l)^H F_{3-i,j}^{-1}(t_k)$, such as by multiplying the Hermitian of the shared predetermined reference vector $v_{ref}^l$ and the inverse of the channel $F_{3-i,j}^{-1}(t_k)$. By multiplying the combining vectors $r_{i,j}^l(t_k)$ and the channel matrix $F_{i,j}(t_k)$, each $UE_j$ device then computes the equivalent channel matrix $f_{i,j}^{l,eq}(t_k) \triangleq (v_{ref}^l)^H F_{3-i,j}^{-1}(t_k) F_{i,j}(t_k)$. The equivalent channel vector computation module 116 shown in FIG. 2 may be used to compute the equivalent channel matrix $f_{i,j}^{l,eq}(t_k)$.

At this point, the equivalent channel matrix $f_{i,j}^{l,eq}(t_k)$ may be fed back to the access devices $TX_i$ along with any channel quality indicator (CQI), either directly or indirectly using codebook or non-codebook techniques. The feedback module 118 shown in FIG. 2 may be used to feedback the equivalent channel matrix and CQI information. In addition or in the alternative, each of the transmitters $TX_1$ and $TX_2$ may acquire the equivalent channel matrix $f_{i,j}^{l,eq}(t_k)$ using uplink channel estimation techniques.

At step 412, each transmitter $TX_i$ acquires $\{f_{i,j}^{l,eq}(t_k)\}_{k=1}^{n1}$ and $\{CQI_{i,j}^l(t_k)\}_{k=1}^{n1}$ values (possibly via the feedback information by UEs) from the UEs, and uses this information to compute the equivalent channel aggregate matrix $F_{i,j}^{eq}(t_k)$ as:

$$F_{i,j}^{eq}(t_k) \triangleq [f_{i,j}^{1,eq}(t_k)^T \ldots f_{i,j}^{d_j,eq}(t_k)^T]^T, \qquad (21)$$

in which $f_{i,j}^{l,eq}(t_k) \triangleq (v_{ref}^l)^H F_{3-i,j}^{-1}(t_k) F_{i,j}(t_k)$. In addition, each transmitter $TX_i$ computes the matrix $P_i(t_k)$ as:

$$P_i(t_k) = \begin{bmatrix} F_{i,1}^{eq}(t_k) \\ \vdots \\ F_{i,L_i}^{eq}(t_k) \\ v_{ref}^{1^T} \\ \vdots \\ v_{ref}^{d_{max}^{3-i}} \end{bmatrix}. \qquad (22)$$

At step 412, each transmitter $TX_i$ also constructs transmit signals $\{q_i(t_k)\}_{k=1}^{n1}$ for the selected $L_i$ UE devices. In selected embodiments, the precoding module 216 shown in FIG. 2 may be used to the construct transmit signals $q_i(t_k)$ using a zero-forcing precoding matrix $V_i(t_k)$ as follows:

$$q_i(t_k) = V_i(t_k) s_i(t_k), \qquad (23)$$

where $V_i(t_k)$ is the first $D^i$ columns of $P_i^+(t_k) = P_i^H(t_k)(P_i(t_k) P_i^H(t_k))^{-1}$, $s_i(t_k) = [s_{i,1}(t_k) \ldots s_{i,L_i}(t_k)]$ is the data vector to be transmitted to the selected UEs in the ith cell, and $s_{i,j}(t_k)$ is a vector of size $d_j^i \times 1$ representing a rank-$d_j^i$ signal that should be transmitted to the selected UE j.

At each transmitter $TX_i$, the data to be transmitted to the selected UE j over the subcarriers $w_1, \ldots w_{n2}$ is split into n1 rank-$d_j^i$ data $\{s_{i,j}(t_k)\}_{k=1}^{n1}$. After computing $\{q_i(t_k)\}_{k=1}^{n1}$, the transmitted signals $x_i$, i=1,2 over subcarriers $w_1, \ldots, w_{n2}$ $\{x_i(w_n)\}_{n=1}^{n2}$ can be computed from Equation (18). The precoding matrix $V_i(t_k)$ can be written as $$V_i(t_k) = [v_{i,1}(t_k) \ldots v_{i,L_i}(t_k)], \qquad (24)$$

where $v_{i,j}(t_k)$ is the precoding matrix of size $M \times d_j^i$ for the $j^{th}$ selected user and we denote the $l^{th}$ column (l=1, ..., $d_j^i$) of this matrix by $v_{i,j}^l(t_k)$. The transmit module 218 shown in FIG. 2 may be used to the transmit signals $q_i(t_k)$.

As a result, the received signal $\tilde{z}_{i,j}^l(t_k)$ appears at the jth UE as:

$$\tilde{z}_{j,1}^l(t_k) = (v_{ref}^l)^H F_{2,j}^{-1}(t_k) z_j(t_k) = f_{1,j}^{l,eq}(t_k) q_1(t_k) + (v_{ref}^l)^H q_2(t_k) + w_{j,1}^{l,eq}(t_k), j=1, \ldots, L, l=1, \ldots, d_j^1, k=1, \ldots, n1, \qquad (25)$$

$$\tilde{z}_{j,2}^l(t_k) = (v_{ref}^l)^H F_{1,j}^{-1}(t_k) z_j(t_k) = (v_{ref}^l)^H q_1(t_k) + f_{2,j}^{l,eq}(t_k) q_2(t_k) + w_{j,2}^{l,eq}(t_k), j=1, \ldots, L, i=1, \ldots, d_j^2, k=1, \ldots, n1, \qquad (26)$$

where $f_{1,j}^{l,eq}(t_k) \triangleq (v_{ref}^l)^H F_{2,j}^{-1}(t_k) F_{1,j}(t_k)$ where $f_{2,j}^{l,eq}(t_k) \triangleq (v_{ref}^l)^H F_{1,j}^{-1}(t_k) F_{2,j}(t_k)$, where $w_{j,1}^{l,eq}(t_k) \triangleq (v_{ref}^l)^H F_{2,j}^{-1}(t_k) w_j(t_k)$, and where $w_{j,2}^{l,eq}(t_k) \triangleq (v_{ref}^l)^H F_{1,j}^{-1}(t_k) w_j(t_k)$.

At step 414, the UE decodes the received data signal, such as by using the decode module 120 shown in FIG. 2. In selected embodiments, each UE(i,j) may know its own precoding vectors for its data streams $\{v_{i,j}^l(t_k)\}_{k=1}^{n1}$ l=1, ..., $d_j^i$, and uses the precoding vectors to decode its $l^{th}$ data stream $\{s_{i,j}^l(t_k)\}_{k=1}^{n1}$ sent from the ith transmitter from $\{\tilde{z}_{j,i}^l(t_k)\}_{k=1}^{n1}$.

For example, using the known precoding vectors to guarantee that inter-cell and intra-cell interference are cancelled for all $t_k$, $k=1, \ldots, n_1$, the $j^{th}$ UE ($j=1, \ldots, L$) can decode its $l^{th}$ data stream from the $i^{th}$ transmitter ($i=1,2$) by single-user detection algorithms using $$\tilde{z}_{j,i}^{l}(t_k) = f_{i,j}^{l,eq}(t_k) v_{i,j}^{l}(t_k) s_{i,j}^{l}(t_k) + w_{j,i}^{l,eq}(t_k), \quad (27)$$

where $s_{i,j}^{l}(t_k)$ denotes the $t_k$-th portion of the $l^{th}$ data stream sent to the $j^{th}$ selected UE from the $i^{th}$ transmitter. At step 416, the process ends.

Using the frequency extension approach, $(D^1+D^2)n_1$ data streams are transmitted in total over $n_2$ subcarriers. As a result, the normalized total number of data streams per subcarrier becomes $$\frac{(D^1+D^2)n_1}{n_2}.$$

Since the sum of data streams provided to the users is less than or equal to the difference between the number of transmit antennas and the the reserved data ranks for interference (i.e., $D^i \leq M - d_{max}^{3-i}$), the maximum total number of data streams per subcarrier becomes $$\frac{(2M - d_{max}^1 - d_{max}^2)n_1}{n_2} = \frac{(2M - d_{max}^1 - d_{max}^2)K}{M}.$$

While the description provided with reference to Equations (11)-(27) explains how the channels $H_{i,j}$ as well as the corresponding transmit and receive signals of UEs are extended in the frequency domain, it will be appreciated that a similar approach would be used to extend the channels $H_{i,j}$ in the time domain. In either case of time or frequency extension, it will be appreciated that there is implied a loss in the spectral efficiency by the ratio of $$\frac{D^i n_1}{n_2}$$

for TX$_i$ compared to the M=K case due to the fact that n1 independent mixed-rank signals are transmitted over n2 subcarriers. As a consequence, the extension scheme may not be suitable for small values of $$\frac{D^i n_1}{n_2}.$$

In addition, it will be appreciated that the frequency extension approach has more potential for practical use since the time extension approach implies decoding delay which is not acceptable for many applications.

Figure 5:
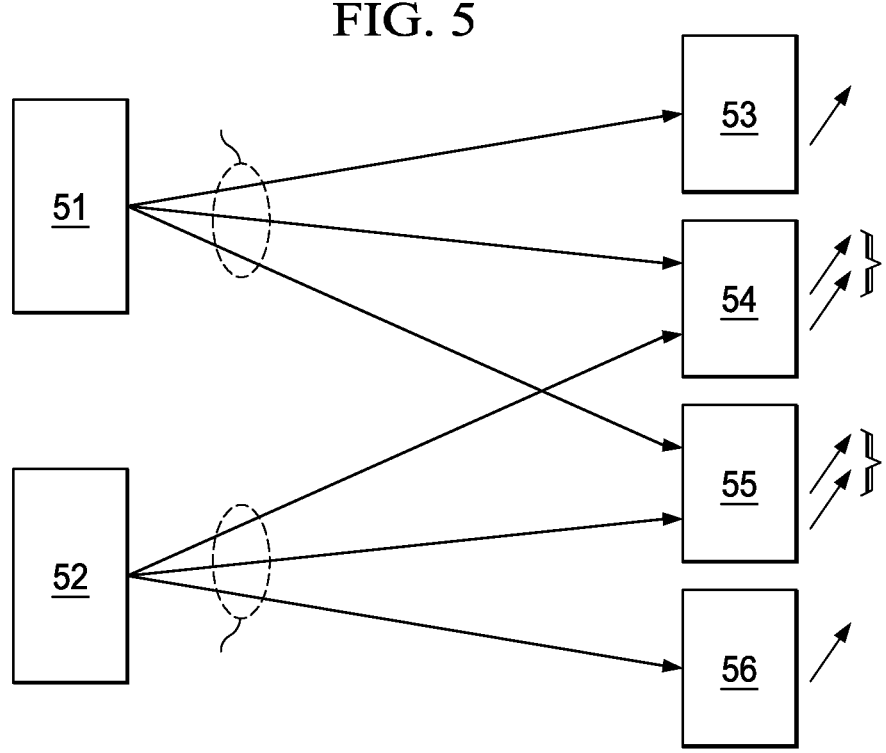
FIG. 5 is a schematic diagram showing components of a communication system embodying a multi-user compound MIMO-X channel with two transmitters using rank-one signaling to serve four receivers.
Figure 6:
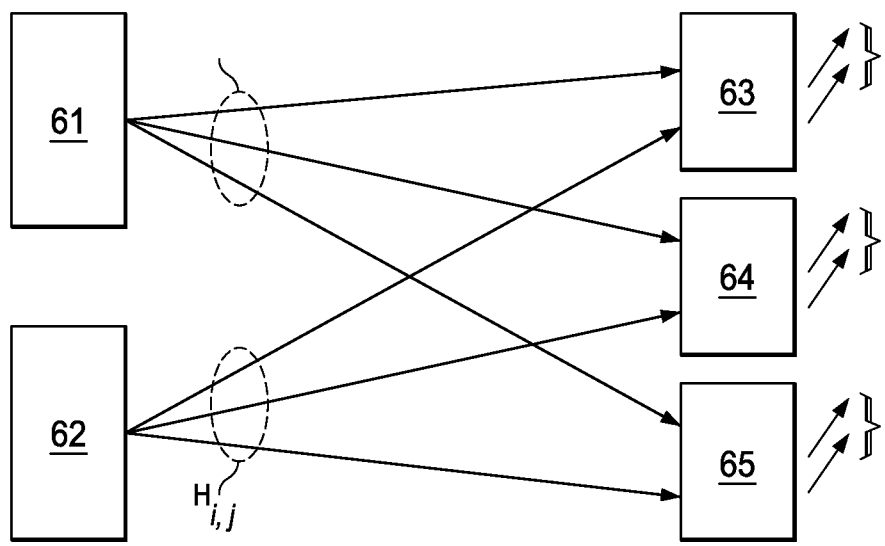
FIG. 6 is a schematic diagram showing components of a communication system embodying a multi-user compound MIMO-X channel with two transmitters using rank-one signaling to serve L receivers.

To illustrate selected embodiments of the present disclosure, some practical scenarios will now be described in which mixed rank downlink compound multi-user interference alignment may be used to provide a compound MIMO-X channel (FIG. 5) and a generalized MIMO-X channel with rank-one (FIG. 6).

Turning now to FIG. 5, there is depicted a schematic diagram showing components of a communication system 50 embodying a multi-user compound MIMO-X channel with two transmitters TX$_1$ 51, TX$_2$ 52 using rank-one signaling to serve four receivers 53-56 to provide a downlink compound MIMO-X channel with rank one. The depicted transmitters 51-52 are each equipped with M=4 antennas to serve four UEs 53-56, each equipped with K=4 antennas. The two transmitters 51-52 can be two eNBs, two RNs, or two femto-cell access points. In addition, there can be other scenarios with a mix of these transmitters, e.g. one transmitter is an eNB and another one is a RN.

In the depicted scenario, the first transmitter TX$_1$ 51 transmits a rank-one signal to UE$_1$, UE$_2$, and UE$_3$ over the $H_{ij}$ channels, and the second transmitter TX$_2$ 52 transmits a rank-one signal to UE$_2$, UE$_3$, and UE$_4$ over the $H_{2j}$ channels. As a result, UE$_2$ 54 and UE$_3$ 55 each receive two data streams, while, UE$_1$ 53 and UE$_4$ 56 each receive only one data stream from their direct serving transmitters. As a result, UE$_1$ 53 and UE$_4$ 56 will feed back a single feedback channel ($H_{1j}$, $H_{2j}$, respectively) to their respective transmitters (TX$_1$ 51, TX$_2$ 52), while UE$_2$ 54 and UE$_3$ 55 will feed back their effective channels to both transmitters.

At each of the single-rank users UE$_1$ and UE$_4$, the received signal appears as:

$$y_j = H_{1j} x_1 + H_{2j} x_2 + n^j, \quad j=1,4 \quad (28)$$

Users UE$_1$ and UE$_4$ are receiving data streams from both transmitters in the form of transmitted signals from one transmitter and interfering signals from the other transmitter. To cancel the interfering signals, the received signals $y_1$ and $y_4$ at UE$_1$ and UE$_4$ are multiplied by combining vectors $v_{ref}^H H_{21}^+$ and $v_{ref}^H H_{14}^+$, respectively, to reveal $$\tilde{y}_1 = v_{ref}^H H_{21}^+ y_1 = h_{11}^{eq} x_1 + v_{ref}^H x_2 + n_1^{eq}, \quad (29)$$

$$\tilde{y}_4 = v_{ref}^H H_{14}^+ y_4 = v_{ref}^H x_1 + h_{24}^{eq} x_2 + n_4^{eq}, \quad (30)$$

where $h_{11}^{eq} = v_{ref}^H H_{21}^+ H_{11}$, $n_1^{eq} = v_{ref}^H H_{21}^+ n_1$, $h_{24}^{eq} = v_{ref}^H H_{14}^+ H_{24}$, $n_4^{eq} = v_{ref}^H H_{14}^+ n_4$, and $H_{ij}^+ = (H_{ij}^H H_{ij})^{-1} H_{ij}^H$. In view of Equations (29) and (30), the transmitted signals $x_i$ (for i=1,2) should be designed at the transmitter TX$_i$ to be in the null space of $v_{ref}$ for interference-free transmission for UE$_1$ and UE$_4$.

On the other hand, the received signals $y_2$ and $y_3$ at UE$_2$ and UE$_3$ can be written as:

$$y_j = H_{1j} x_1 + H_{2j} x_2 + n_j, \quad j=2,3 \quad (31)$$

where these UEs are receiving a rank-one transmission $x_1$ from transmitter TX$_1$ 51 and another rank-one transmission $x_2$ from transmitter TX$_2$ 52. To receive both rank-one transmissions, the received signal at each UE$_2$ and UE$_3$ can be multiplied by $v_{ref}^H H_{1j}^+$ and $v_{ref}^H H_{2j}^+$, resulting in:

$$\tilde{y}_{j,1} = v_{ref}^H H_{2j}^+ y_j = h_{1j}^{eq} x_1 + v_{ref}^H x_2 + n_{j,1}^{eq}, \quad j=2,3 \quad (32)$$

$$\tilde{y}_{j,2} = v_{ref}^H H_{1j}^+ y_j = v_{ref}^H x_1 + h_{2j}^{eq} x_2 + n_{j,2}^{eq}, \quad j=2,3 \quad (33)$$

By having UE$_2$ and UE$_3$ each feed back equivalent direct channel $h_{1j}^{eq}$ and $h_{2j}^{eq}$ (for j=2,3) to the corresponding transmitters, each transmitter TX$_i$ can design the transmitted signal $x_i$ (for i=1,2) to be in the null space of $v_{ref}$, thereby enabling each receiver UE$_2$ and UE$_3$ to decode two streams of data from the received signal. By using the linearly independent, predetermined vectors $v_{ref} = \{v_{ref}^1, \ldots, v_{ref}^M\}$ to compute the equivalent direct channel vectors $h_{1j}^{eq}$ and $h_{2j}^{eq}$, there is a probability almost equal to one that the two equivalent vectors $h_{1j}^{eq}$ and $h_{2j}^{eq}$ and linearly independent for UE$_2$ and UE$_3$.

Provided that the transmitted signals $x_i$ for i=1,2 are designed in the null space of the predetermined vector set, $v_{ref}$. Equations (29), (30), (32), and (33) can be associated with two transmitters $TX_1$ 51, $TX_2$ 52 as follows. At the first transmitter $TX_1$:

$$\tilde{y}_1 = h_{11}^{eq} x_1 + n_1^{eq}, \tilde{y}_{2,1} = h_{12}^{eq} x_1 + n_{2,1}^{eq}, \text{ and } \tilde{y}_{3,1} = h_{13}^{eq} x_1 + n_{3,1}^{eq}. \quad (34)$$

At the second transmitter $TX_2$:

$$\tilde{y}_4 = h_{24}^{eq} x_2 + n_4^{eq}, \tilde{y}_{2,2} = h_{2j}^{eq} x_2 + n_{2,2}^{eq}, \text{ and } \tilde{y}_{3,2} = h_{2j}^{eq} x_2 + n_{3,2}^{eq}. \quad (35)$$

Based on the foregoing, the cross serving UE ($UE_2$ or $UE_3$) for each $TX_i$ can be treated as a third UE requesting a rank-one transmission, along with the direct serving UEs. As a result, each UE should have at least four receive antennas (e.g., $K \geq 4$). For the sake of simplicity, the foregoing equations are based on the assumption that $K \geq M$. However, the case of $K < M$ is a straight forward revision of the Equations (11)-(27).

Turning now to FIG. 6, there is depicted a schematic diagram showing components of a communication system 60 embodying a generalized multi-user compound MIMO-X channel with two transmitters $TX_1$ 61, $TX_2$ 62 using rank-one signaling to serve L receivers 603-605 to provide a downlink compound MIMO-X channel with rank one. The depicted transmitters 61-62 are each equipped with M=4 antennas to serve L UEs 63-65, each equipped with K antennas. The two transmitters 61-62 can be two eNBs, two RNs, two femto-cell access points, or distributed antenna systems. In addition, there can be other scenarios with a mix of these transmitters, e.g. one transmitter is an eNB and another one is a RN.

In the depicted scenario, the first transmitter $TX_1$ 61 transmits a rank-one signal to all UEs 63-65 over the $H_{1,j}$ channels, and the second transmitter $TX_2$ 62 transmits a rank-one signal to all UEs 63-65 over the $H_{2,j}$ channels. In other words, all UEs receive two data streams, one from $TX_1$ and one from $TX_2$. As a result, each UE will feed back their effective channels to both transmitters.

At each $UE_j$, the received signal appears as:

$$y_j = H_{1j} x_1 + H_{2j} x_2 + n_j, j=1, \ldots, L \quad (35)$$

where these UEs are getting a rank-one transmission $x_1$ from the first transmitter $TX_1$ 61 and another rank-one transmission from $x_2$ the second transmitter $TX_2$ 62. By processing or multiplying the received signal with first and second combining vectors, $v_{ref}^H H_{1j}^+$ and $v_{ref}^H H_{2j}^+$, the resulting signal is:

$$\tilde{y}_{j,1} = v_{ref}^H H_{2j}^+ y_j = h_{1j}^{eq} x_1 + v_{ref}^H x_2 + n_{j,1}^{eq}, j=1,\ldots,L \quad (36)$$

$$\tilde{y}_{j,2} = v_{ref}^H H_{1j}^+ y_j = v_{ref}^H x_1 + h_{2j}^{eq} x_2 + n_{j,2}^{eq}, j=1,\ldots,L \quad (37)$$

where $H_{i,j}^+ = (H_{i,j}^H H_{i,j})^{-1} H_{i,j}^H$. The $j^{th}$ UE can feed back equivalent direct channel $h_{1j}^{eq}$ and $h_{2j}^{eq}$ to corresponding transmitters. Therefore, as long as the transmitted signals $x_i$ (for i=1,2) are designed such that they are in the null space of $v_{ref}^H$, $UE_j$ can decode two streams of data from the received signal. There is a probability almost equal to one that the two equivalent vectors $h_{1j}^{eq}$ and $h_{2j}^{eq}$ are linearly independent for each $UE_j$.

When the transmitted signals $x_i$ for i=1,2 are designed in the null space of the predetermined vector set, $v_{ref}$, the resulting signals from Equations (36) and (37) can be written as:

$$\tilde{y}_{j,1} = h_{1j}^{eq} x_1 + n_{j,1}^{eq}, j=1,\ldots,L \quad (38)$$

$$\tilde{y}_{j,2} = h_{2j}^{eq} x_2 + n_{j,2}^{eq}, j=1,\ldots,L \quad (39)$$

Based on the foregoing, each of the transmitters 61, 62 TXi (i=1,2) can provide a multi-user MIMO channel for users j=1,..., L with equivalent channel vectors $h_{ij}^{eq}$. For example, if zero-forcing precoding is used, the $i^{th}$ transmitter should use the first L columns in the inverse of the matrix $[h_{i1}^{eqT} \ldots h_{iL}^{eqT} v_{ref}]^T$ as the precoding matrix $V_i$ for constructing the transmitted signal $x_i = V_i s_i$ (for i=1,2), provided that the number of transmit antennas M exceeds the number of users L (i.e., $M \geq L+1$). For the sake of simplicity, Equations (35)-(39) are based on the assumption that $K \geq M$ in writing equations. However, the case of $K < M$ is a straight forward revision of the Equations (11)-(27).

UE Selection and Scheduling

Figure 7:
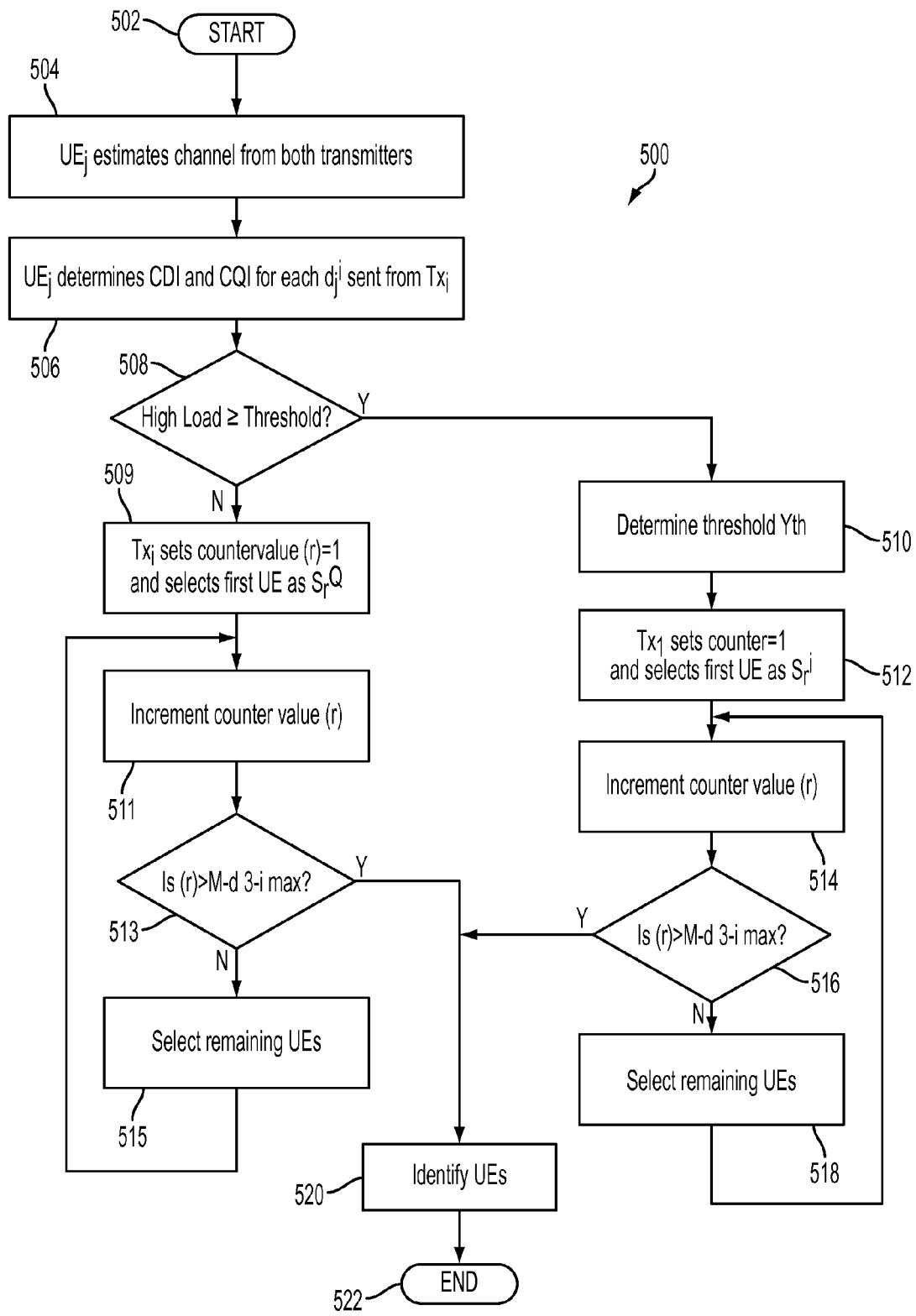
FIG. 7 is a flow chart illustrating a receiver selection process that may be performed when the number of receiver antennas equals or exceeds the number of transmitter antennas.

When the transmitter is selecting $L_i$ UEs in cell i that is less than the total number of UEs (N), selected embodiments of the present disclosure provide a low-complexity scheduling and pairing scheme for choosing the UEs that achieves good performance and improves the throughput performance of the system. To illustrate an example receiver selection process, reference is now made to FIG. 7 which depicts in flow chart form a receiver selection process 500 that may be performed in cases when the number of receiver antennas equals or exceeds the number of transmitter antennas (e.g. $K \geq M$). Once the procedure starts (step 502), each $UE_j$ device estimates the channel from both transmitters (step 504). The UE also estimates the rank of each channel to $TX_i(d_j^i)$ at step 504, such as by using, for example, the same procedure as 3GPP Release 8 LTE or LTE-A. The UE reports back this rank as RI to the $TX_i$ (i=1,2) and request a signal of rank $d_j^i$. Then, each $UE_j$ device computes (step 504) its effective channel vectors for each requested data stream as $h_{i,j}^{l,eq} = (v_{ref}^l)^H H_{3-i,j}^+ H_{i,j}$, for $l=1, \ldots, d_j^i$ and its effective noise power as $\mathfrak{N}_{i,j}^{l,eff} = E\{|n_{j,i}^{l,eq}|^2\}$.

At step 506, each $UE_j$ device computes channel direction information (CDI) and channel quality information (CQI) values for each $d_j^i$ data stream sent from each transmitter $TX_i$, such as the following examples:

$$CDI_{i,j}^l \triangleq \frac{h_{i,j}^{l,eq}}{\|h_{i,j}^{l,eq}\|}, \quad (40)$$

$$CQI_{i,j}^l \triangleq \frac{\|h_{i,j}^{l,eq}\|^2 - |h_{i,j}^{l,eq} v_{ref}^l|^2}{\mathfrak{N}_{i,j}^{l,eff}},$$

for $l = 1, \ldots, d_j^i$, $i = 1, 2$.

While each $UE_j$ device may feed back the computed CDI and CQI values for all requested $d_j^i$ date streams to the corresponding transmitters $TX_i$ (i=1,2), it will be appreciated that there might be no need for feeding back $CDI_{i,j}^l$ in the TDD mode when the transmitters can acquire it from the UL channel.

At decision block 508, it is determined if there is a high load that meets or exceeds a threshold level. This decision may be implemented by comparing the total number of UEs ($N_i$) to a threshold load number ($N_{th}$).

If there is a high user load ($N \geq N_{th}$), a pre-configured threshold $\gamma_{th}$ is retrieved or computed at step 510 and used by the transmitter $TX_i$ to construct the following set:

$$S_i \triangleq \{(j,l) | \beta_{i,j} CQI_{i,j}^l > \gamma_{th}\}, \quad (41)$$

where $\beta_{i,j}$ denotes the scheduling parameter. Then, each transmitter $TX_i$ (i=1,2) perform the following steps:

At step 512, each transmitter $TX_i$ (i=1,2) sets a counter value r=1 and selects the first UE (denoted $s_r^i$) as follows:

$$(s_r^i, q_r^i) = \arg\max_{(j,l)} \beta_{i,j} CQI_{i,j}^l \text{ for } (j,l) \in S_i. \quad (42)$$

In Equation (42) it is possible that a previously selected UE is selected again for considering another rank. Therefore, the rank of the signal for the UE $s_r^i$, corresponding to $TX_i$, is increased by one: $d_{s_r}^i = d_{s_r}^i + 1$ to keep track of its rank (the initial value for all $d_j^i = 0$).

At step 514, the counter value r is incremented, and at step 516, the transmitter $TX_i$ determines if the counter value exceeds the number of $M - d_{max}^{3-i}$ available ranks.

At step 518, the remaining UEs are selected with an iterative process for so long as the counter value does not exceed $M - d_{max}^{3-i}$ (e.g., negative outcome to decision block 516). In step 518, the transmitter $TX_i$ defines the set of previously selected UEs as $S_{i,r-1} \triangleq \{(s_1^i, q_1^i), \ldots, (s_{r-1}^i, q_{r-1}^i)\}$. In addition, $\mathcal{P}_{r-1}^i$ is defined as the sub-space spanned by the CDI vectors of the previously selected UEs, i.e. $\mathcal{P}_{r-1}^i \triangleq$ span $(CDI_{i,s_1^i}^{q_1^i}, \ldots, CDI_{i,s_{r-1}^i}^{q_{r-1}^i})$. Finally, for all $(j,l) \in S_i - S_{i,r-1}$, the transmitter $TX_i$ defines $\mathcal{p}_{i,j}^{l,(r-1)}$ as the projection of $CDI_{i,j}^l$ over $\mathcal{P}_{r-1}^i$, and then selects $$(s_r^i, q_r^i) = \arg\min_{(j,l) \in S_i - S_{i,r-1}} \|\mathcal{p}_{i,j}^{l,(r-1)}\|^2. \quad (43)$$

For counter values r=2 to $M - d_{max}^{3-i}$, the process is repeated until the counter value exceeds $M - d_{max}^{3-i}$ (e.g., affirmative outcome to decision block 516). At this point, the UEs selected for the high user load are identified at step 520 as $(s_1^i, \ldots s_{L_i}^i)$, where the number of selected UEs $L_i$ would be defined as the cardinality of the set $\{s_1^i, \ldots, s_{M-d_{max}^{3-i}}^i\}$ (which is the number of different users in this set) and the process ends (step 522).

On the other hand, if it is determined (at decision block 508) that there is a medium or low user load ($N_i < N_{th}$), each transmitter $TX_i$ (i=1,2) sets a counter value r=1 and selects the first UE (denoted $s_r$) at step 509 as follows:

$$(s_r^i, q_r^i) = \arg\max_{(j,l)} \beta_{i,j} CDI_{i,j}^l, \text{ for } l=1,\ldots, d_j^i, j=1,\ldots, N. \quad (44)$$

In Equation (44) it is possible that a previously selected UE is selected again for considering another rank. Therefore, the rank of the signal received from $TX_i$ for the UE $s_r^i$ may be increased by one: $d_{s_r}^i = d_{s_r}^i + 1$ to keep track of its rank (the initial value for all $d_j^i = 0$).

At step 511, the counter value r is incremented, and at step 513, the transmitter $TX_i$ determines if the counter value exceeds the number of $M - d_{max}^{3-i}$ available ranks.

At step 515, the remaining UEs are selected with an iterative process for so long as the counter value does not exceed $M - d_{max}^{3-i}$ (e.g., negative outcome to decision block 513). In step 515, the transmitter $TX_i$ defines the set of previously selected UEs as $S_{i,r-1} \triangleq \{(s_1^i, q_1^i), \ldots, (s_{r-1}^i, q_{r-1}^i)\}$. In addition, $\mathcal{P}_{r-1}^i$ is defined as the sub-space spanned by the CDI vectors of the previously selected UEs, i.e. $\mathcal{P}_{r-1}^i \triangleq$ span $(CDI_{i,s_1^i}^{q_1^i}, \ldots, CDI_{i,s_{r-1}^i}^{q_{r-1}^i})$. Finally, for all $(j,l) \notin S_{i,r-1}$, the transmitter $TX_i$ defines $\mathcal{p}_{i,j}^{l,(r-1)}$ as the projection of $CDI_{i,j}^l$ over $\mathcal{P}_{r-1}^i$, and then selects $$(s_r^i, q_r^i) = \arg\max_{(j,l) \notin S_{i,r-1}} \beta_{i,j} CQI_{i,j}^l (1 - \|\mathcal{p}_{i,j}^{l,(r-1)}\|^2). \quad (45)$$

For counter values r=2 to $$M - d_{max}^{3-i},$$

the process is repeated until the counter value exceeds $$M - d_{max}^{3-i}$$

(e.g., affirmative outcome to decision block 513). At this point, the UEs selected for the medium or low user load are identified at step 520 as $(s_1^i, \ldots s_{L_i}^i)$, where the number of selected UEs $L_i$ would be defined as the cardinality of the $$\text{set}\{s_1^i, \ldots, s_{M-d_{max}^{3-i}}^i\}$$

(which is the number of different users in this set) and the process ends (step 522).

As described herein, the threshold values $N_{th}$ and $\gamma_{th}$ may be configurable and can be optimized based on the system parameters. By tuning the threshold values, the disclosed selection process chooses UEs having an effective SNR values (approximated by CQI values) that are high enough while maximizing the orthogonality of their equivalent direct channels. The SNR values are calculated for all requested data stream (the requested RI) and all data streams having high enough SNR values will be selected in scheduling procedure. While the selection process for a medium or low user load can be used in the high user load case, it will be appreciated that the selection process for a high user load reduces algorithm complexity and the feedback load (in the FDD mode), since only a portion of the users are considered in the scheduling. This helps reducing the feedback load of CQI to just one bit since the UEs just need to send an acknowledgement bit to their affiliated transmitter indicating that whether or not their effective SNR is above the threshold or not and the actual value of CQI is not important.

The aforementioned procedure is performed by each transmitter $TX_i$ (i=1,2), independent of each other. In order to select $L_i$ UEs, the transmitter i needs to know the maximum rank $d_{max}^{3-i}$ that the other transmitter is sending, but at the beginning of the scheduling procedure, it is not known. In one embodiment, both transmitters can set $d_{max}^{3-i}$ to its minimum value 1, i.e. $d_{max}^{3-i} = 1$. Transmitter i can support $L_i$ UEs such that $D^i + d_{max}^{3-i}$ is less than M. After the procedure 500 ends at step 513 or step 516, the transmitters can negotiate on the values of $d_{max}^{3-i}$. If the transmitter (3-i) asks for a $d_{max}^{3-i} > 1$, the current transmitter i should remove the last $d_{max}^{3-i} - 1$ selected users in $S_{i,M-d_{max}^{3-i}-1}$ and adjust the number of its affiliated UEs $L_i$.

In another embodiment, transmitters can fix the value of $d_{max}^i$ and rejects any request by any UE which is requesting a rank more than $d_{max}^{3-i}$. In other words, if UEs reporting $d_j^i$ CDIs and CQIs for $d_j^i$ data streams in Equation (40), transmitters consider only the first $d_{max}^i$ values for CDI and CQI that maximizes $\beta_{i,j} CQI_{i,j}^l$ in Equations (42) or (44). Note that the accepted rank of each UE is saved in $d_{s_r}^i$, i=1,2.

Figure 8:
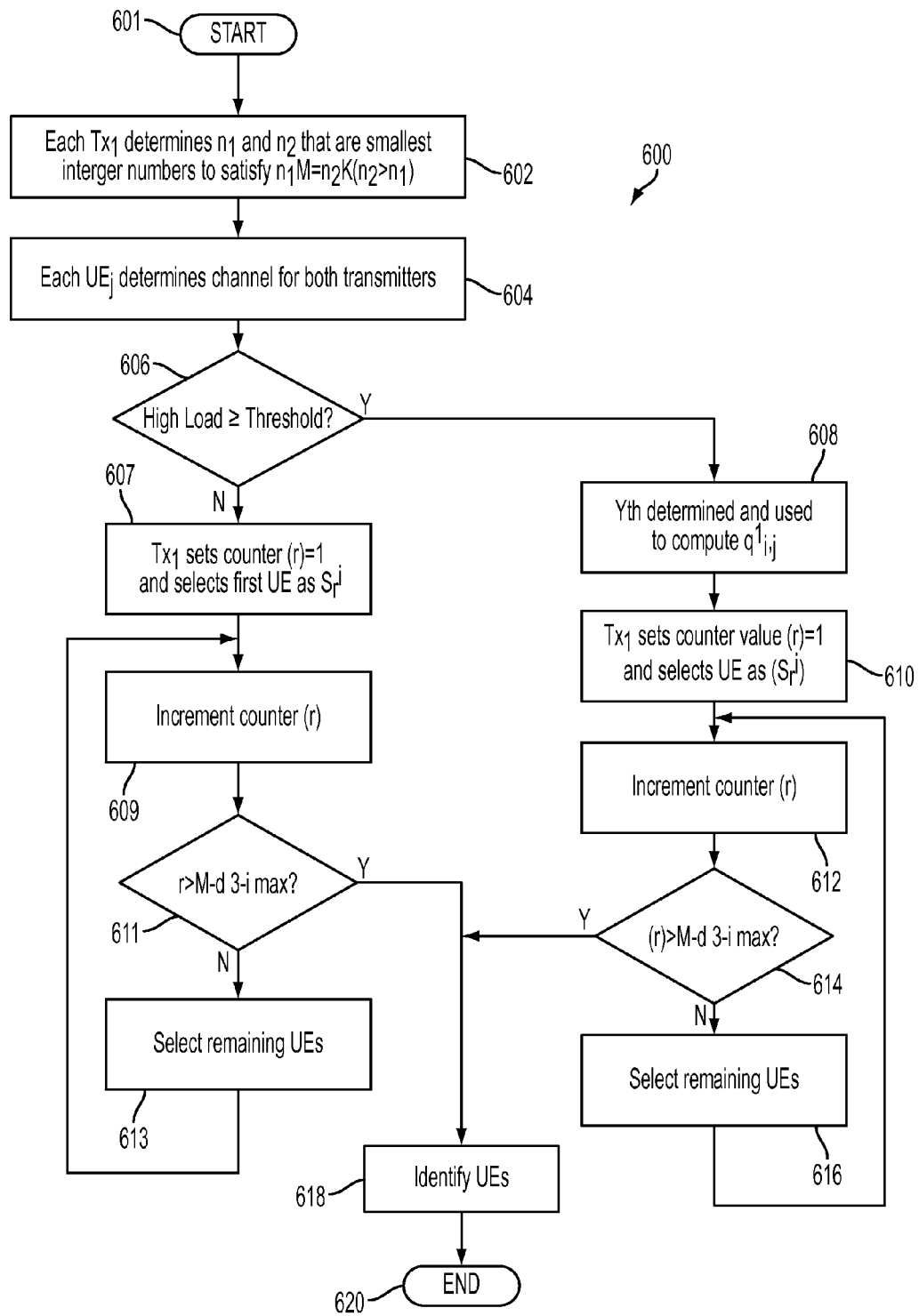
FIG. 8 is a flow chart illustrating a receiver selection process that may be performed to extend the interfering channels in frequency in cases when the number of transmitter antennas exceeds the number of receiver antennas.

Additional receiver scheduling algorithms are disclosed for selecting $L_i$ from N total number of UEs when the UE antenna count is less than the transmitter antenna count. To illustrate an example receiver selection process for these embodiments, reference is now made to FIG. 8 which depicts in flow chart form a receiver selection process 600 that may be performed to extend the channels in frequency or time in cases when the number of transmitter antennas exceeds the number of receiver antennas (e.g. K<M). Once the procedure starts (step 601), each transmitter device $TX_i$ (i=1,2) finds or derives n1 and n2 (at step 602) that are the smallest integer numbers such that: n1M=n2K (n2>n1). After computing n1 and n2, each transmitter $TX_i$ selects the subcarriers $w_1, \ldots, w_{n2}$ for implementing the proposed scheme and considers the set of N UEs that can potentially be considered for the scheduling.

At step 604, each $UE_j$ device estimates the channel from both transmitters. The UE estimates the rank of the channel from $TX_i(d_j^i)$ for example using the same procedure as 3GPP Release 8 LTE or LTE-A. The UE reports back this rank as RI to $TX_i$ and request a signal of rank $d_j^i$. Then, each $UE_j$ device estimates their direct and cross channels, and following Equations (15)-(20), each $UE_j$ device computes its effective direct channel for each $t_k$ as $f_{i,j}^{l,eq}(t_k) \triangleq (v_{ref}^l)^H F_{3-i,j}^{-1}(t_k) F_{i,j}(t_k)$ and their effective noise power as $\Re_{i,j}^{l,eff}(t_k) = E\{|w_{j,i}^{l,eq}(t_k)|^2\}$ for l=1, ..., $d_j^i$. In addition, each $UE_j$ device computes channel direction information (CDI) and channel quality information (CQI) values for each $d_j^i$ data streams and each $t_k$ as follows:

$$CDI_{i,j}^l(t_k) \triangleq \frac{k_{i,j}^{l,eq}(t_k)}{\|k_{i,j}^{l,eq}(t_k)\|}, \quad (46)$$

$$CQI_{i,j}^l(t_k) \triangleq \frac{\|k_{i,j}^{l,eq}(t_k)\|^2 - |k_{i,j}^{l,eq}(t_k)v_{ref}|^2}{R_{i,j}^{l,eff}(t_k)},$$

for $l = 1, \ldots, d_j^i$, $i = 1, 2$.

While each $UE_j$ device may feed back the computed CDI and CQI values for all requested $d_j^i$ date streams to the corresponding transmitter for each $t_k$, it will be appreciated that there might be no need for feeding back $CDI_{i,j}^l(t_k)$ in the TDD mode when the transmitters can acquire it from the UL channel.

At decision block 606, it is determined if there is a high load that meets or exceeds a threshold level. This decision may be implemented by comparing the total number of UEs (N) to a threshold load number ($N_{th}$).

If there is a high user load (N≥$N_{th}$), a pre-configured threshold $\gamma_{th}$ is retrieved or computed at step 608 and used by the transmitter $TX_i$ to compute following metric for $UE_j$:

$$q_{i,j}^l \triangleq \Sigma_{k=1}^{n1} \beta_{i,j} \log(1 + CQI_{i,j}^l(t_k)), \quad (47)$$

in which $\beta_{i,j}$ denotes the scheduling parameter, such as a proportional fairness scheduling parameter. At step 608, the transmitter $TX_i$ also constructs the following set:

$$S_i \triangleq \{(j,l) | q_{i,j}^l > \gamma_{th}\}. \quad (48)$$

Then, each transmitter $TX_i$ (i=1,2) do the following steps
At step 610, the transmitter $TX_i$ sets a counter value r=1 and selects the first UE (denoted $s_r^i$) as follows:

$$(s_1^i, q_r^i) = \arg\max_{(j,l)} q_{i,j}^l \text{ for } (j,l) \in S_i. \quad (49)$$

In Equation (49) it is possible that a previously selected UE is selected again for considering another rank. Therefore, we increase the rank of the signal, received from $TX_i$, for the UE $s_r$ by one: $d_{s_r}^i = d_{s_r}^i + 1$ to keep track of its rank (the initial value for all $d_j^i = 0$).

At step 612, the counter value r is incremented, and at step 614, the transmitter $TX_i$ determines if the counter value exceeds the number of $M - d_{max}^{3-i}$ available ranks.

At step 616, the remaining UEs are selected with an iterative process for so long as the counter value does not exceed $M - d_{max}^{3-i}$ (e.g., negative outcome to decision block 814). In step 616, t the transmitter $TX_i$ the set of previously selected UEs as $S_{i,r-1} \triangleq \{(s_1^i, q_1^i), \ldots, (s_{r-1}^i, q_{r-1}^i)\}$. In addition, the transmitter $TX_i$ defines $\mathcal{P}_{r-1}^i(t_k) \triangleq \text{span}(CDI_{i,s_1}^{q_1^i}(t_k), \ldots, CDI_{i,s_{r-1}}^{q_{r-1}^i}(t_k))$. Finally, for all $(j,l) \in S_i - S_{i,r-1}$, the transmitter $TX_i$ defines $\mathcal{P}_{i,j}^{l,(r-1)}(t_k)$ as the projection of $CDI_{i,j}^l(t_k)$ over $\mathcal{P}_{r-1}^i(t_k)$, and then selects the next UE by computing:

$$s_r^i = \arg\min_{(j,l) \in S_i - S_{i,r-1}} \sum_{k=1}^{n1} \|\mathcal{P}_{i,j}^{l,(r-1)}(t_k)\|^2. \quad (50)$$

For counter values r=2 to $M - d_{max}^{3-i}$, the process is repeated until the counter value exceeds $M - d_{max}^{3-i}$ (e.g., affirmative outcome to decision block 614). At this point, the UEs selected for the high user load are identified at step 618 as $(s_1^i, \ldots s_{L_i}^i)$, where the number of selected UEs $L_i$ would be defined as the cardinality of the set $\{s_1^i, \ldots, s_{M-d_{max}^{3-i}}^i\}$ (which is the number of different users in this set) and the process ends (step 620).

If it is determined (at decision block 606) that there is a medium or low user load ($N_i < N_{th}$), each transmitter $TX_i$ (i=1,2) sets a counter value r=1 and selects the first UE (denoted $s_r^i$) at step 607 as follows:

$$(s_r^i, q_r^i) = \arg\max_{(j,l)} q_{i,j}^l, \text{ for } l=1, \ldots, d_j^i, j=1, \ldots, N. \quad (51)$$

In Equation (51) it is possible that a previously selected UE is selected again for considering another rank Therefore, the rank of the signal received from $TX_i$ for the UE $s_r$ may be incremented by one: $d_{s_r}^i = d_{s_r}^i + 1$ to keep track of its rank (the initial value for all $d_j^i = 0$).

At step 609, the counter value r is incremented, and at step 611, the transmitter $TX_i$ determines if the counter value exceeds the number of $M - d_{max}^{3-i}$ available ranks.

At step 613, the remaining UEs are selected with an iterative process for so long as the counter value does not exceed $M - d_{max}^{3-i}$ (e.g., negative outcome to decision block 611). In step 613, the transmitter $TX_i$ defines the set of previously selected UEs as $S_{i,r-1} \triangleq \{(s_1^i, q_1^i), \ldots, (s_{r-1}^i, q_{r-1}^i)\}$. The transmitter also defines $\mathcal{P}_{r-1}^i(t_k) \triangleq \text{span}(CDI_{i,s_1}^{q_1^i}(t_k), \ldots, CDI_{i,s_{r-1}}^{q_{r-1}^i}(t_k))$. Finally, for all $(j,l) \in S_{i,r-1}$, the transmitter $TX_i$ defines $\mathcal{P}_{i,j}^{l(r-1)}(t_k)$ as the projection of $CDI_{i,j}^l(t_k)$ over $\mathcal{P}_{r-1}^i(t_k)$, and then selects the next UE by computing:

$$(s_r^i, q_r^i) = \arg\max_{(j,l) \notin S_{1,r-1}} \sum_{k=1}^{n1} \beta_{i,j} \log(1 + CQI_{i,j}^l(t_k)(1 - \|\mathcal{P}_{i,j}^{l(r-1)}\|^2)). \quad (52)$$

For counter values r=2 to M $d_{max}^{3-i}$, the process is repeated until the counter value exceeds $L_i$ (e.g., affirmative outcome to decision block 611). At this point, the UEs selected for the medium or low user load are identified at step 618 as $(s_1^i, \ldots s_{L_i}^i)$, where the number of selected UEs $L_i$ would be defined as the cardinality of the set $\{s_1^i, \ldots, s_{M-d_{max}^{3-i}}^i\}$ (which is the number of different users in this set) and the process ends (step 620).

Again, it will be appreciated that threshold parameters $N_{th}$ and $\gamma_{th}$ can be optimized based on the system parameters. The UE selection algorithm proposed for the case of K<M is very similar to the one proposed for the case of K≥M, with the difference that the same set of UEs must be scheduled for all subcarriers $w_1, \ldots, w_{n2}$. As a result, it is possible to select UEs with fairly good channels in all subcarriers for the case of K<M.

In the case where Euclidean Distance Minimization techniques are used to find a combining vector for cases where the UE antenna count K is less than the transmitter antenna count M, the scheduling algorithm can be the same as in the case of K≥M except for the calculation of the CQI values. In particular, since in this case the inter-cell interference cannot be eliminated, CQI may reflect the inter-cell interference for better scheduling performance. For this purpose, CQIs for $UE_j$ may be defined as follows:

$$CQI_{i,j}^l \triangleq \frac{\frac{P_i}{D^i}(\|h_{i,j}^{l,eff}\|^2 - |h_{i,j}^{l,eff} v_{ref}^l|^2)}{\left(1 - \frac{|(v_{ref}^l)^H H_{3-i,j}^+ H_{i,j} v_{ref}^l|^2}{\|(v_{ref}^l)^H H_{3-i,j}^+ H_{i,j}\|^2}\right)\frac{P_{3-i}}{M-1} + E\{|n_{j,i}^{l,eq}|^2\}} \quad (53)$$

where $h_{i,j}^{l,eff} = (v_{ref}^l)^H H_{3-i,j}^+ H_{i,j}$. Having CQI defined as above, one may follow the same scheduling algorithm as in the case of K≥M (shown in FIG. 7).

As seen from the foregoing, the disclosed mixed rank downlink compound multi-user interference alignment techniques provide significant multiplexing gains with good performance and reduced complexity to address interference between two transmitters, each serving the maximum possible number of UEs simultaneously, while allowing receivers with local CSI knowledge to receive data from both transmitter nodes. For example, the disclosed IA schemes provide acceptable performance with local-only or partial CSI assumptions at the transmitters, thereby avoiding the requirement of large feedback overhead that the current LTE cellular networks and even LTE-A cannot handle. In addition, the disclosed IA schemes do not require a large amount of coordination between the nodes that increases dramatically when the number of coordinating nodes increases. And by eliminating the requirement of large global channel feedback, the feedback challenges associated with high mobility scenarios and feedback delay are avoided.

Figure 9:
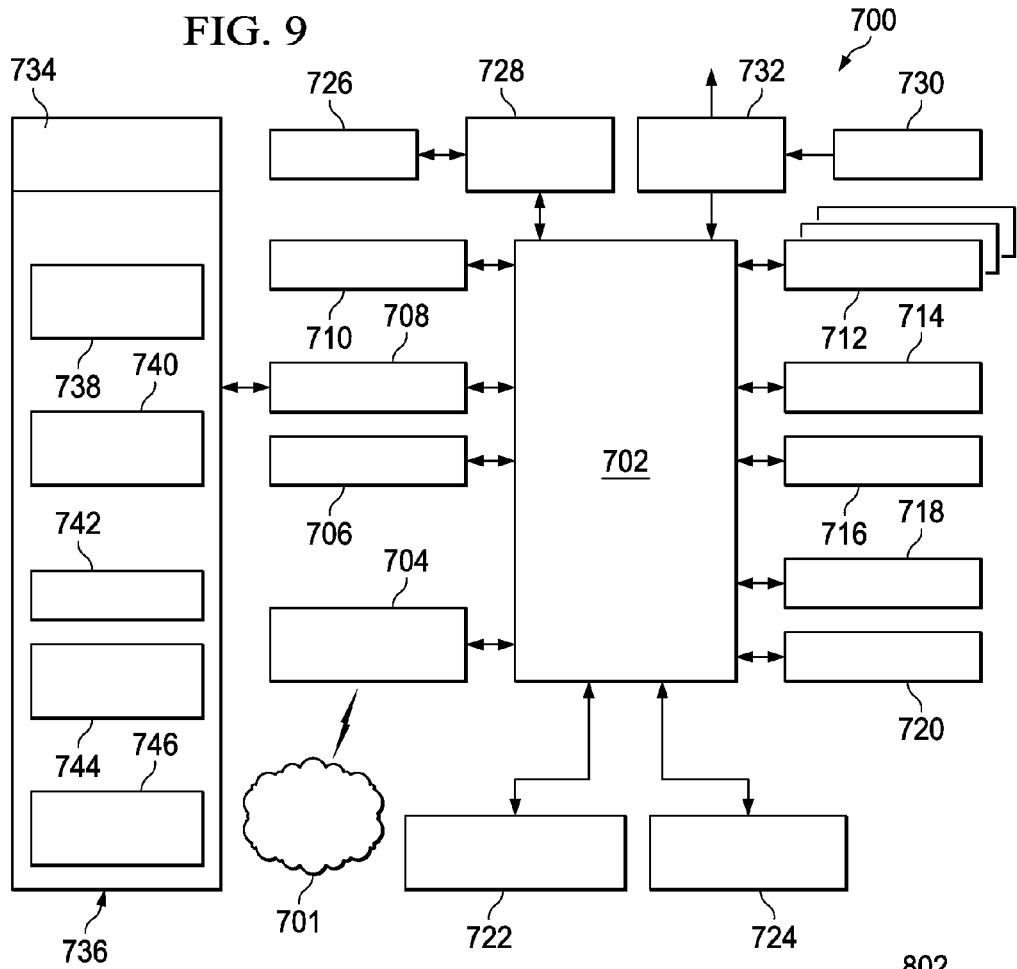
FIG. 9 is a block diagram of a user equipment device.

Referring now to FIG. 9, there is shown a schematic block diagram illustrating exemplary components of a mobile wireless communications or user equipment device 700 which may be used with selected embodiments of the present disclosure. The wireless device 700 is shown with specific components for implementing features described above. It is to be understood that the wireless device 700 is shown with very specific details for exemplary purposes only. As depicted, user equipment 700 includes a number of components such as a main processor 702 that controls the overall operation of user equipment 700. Communication functions, including data and voice communications, are performed through a communication subsystem 704. The communication subsystem 104 receives messages from and sends messages to a wireless network 701. In this illustrative embodiment of user equipment 700, communication subsystem 704 is configured in accordance with the Global System for Mobile Communication (GSM) and General Packet Radio Services (GPRS) standards. The GSM/GPRS wireless network is used worldwide and these standards may be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 704 with the wireless network 701 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 701 associated with user equipment 700 is a GSM/GPRS wireless network in one implementation, other wireless networks may also be associated with user equipment 700 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future generation networks like EDGE, UMTS, WiMAX, LTE and LTE-A. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 702 also interacts with additional subsystems such as a Random Access Memory (RAM) 706, a flash memory 708, a display 710, an auxiliary input/output (I/O) subsystem 712, a data port 714, a keyboard 716, a speaker 718, a microphone 720, short-range communications 722, and other device subsystems 724.

Some of the subsystems of the user equipment 700 perform communication-related functions, whereas other subsystems may provide "resident" or on-device functions. By way of example, the display 710 and the keyboard 716 may be used for both communication-related functions, such as entering a text message for transmission over the network 701, and device-resident functions such as a calculator or task list.

The user equipment 700 can send and receive communication signals over the wireless network 701 after required network registration or activation procedures have been completed. Network access is associated with a subscriber or user of the user equipment 700. To identify a subscriber, the user equipment 700 requires a SIM/RUIM card 726 (i.e. Subscriber Identity Module or a Removable User Identity Module) to be inserted into a SIM/RUIM interface 728 in order to communicate with a network. The SIM card or RUIM 726 is one type of a conventional "smart card" that can be used to identify a subscriber of the user equipment 700 and to personalize the user equipment 700, among other things. Without the SIM card 726, the user equipment 700 is not fully operational for communication with the wireless network 701. By inserting the SIM card/RUIM 726 into the SIM/RUIM interface 728, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 726 includes a processor and memory for storing information. Once the SIM card/RUIM 726 is inserted into the SIM/RUIM interface 728, it is coupled to the main processor 702. In order to identify the subscriber, the SIM card/RUIM 726 can include some user parameters such as an International Mobile Subscriber Identity (IMSI). An advantage of using the SIM card/RUIM 726 is that a subscriber is not necessarily bound by any single physical user equipment. The SIM card/RUIM 726 may store additional subscriber information for user equipment as well, including datebook (or calendar) information and recent call information. Alternatively, user identification information can also be programmed into the flash memory 708.

The user equipment 700 is a battery-powered device and includes a battery interface 732 for receiving one or more rechargeable batteries 730. In at least some embodiments, the battery 730 can be a smart battery with an embedded microprocessor. The battery interface 732 is coupled to a regulator (not shown), which assists the battery 730 in providing power V+ to the user equipment 700. Although current technology makes use of a battery, future technologies such as micro fuel cells may provide the power to the user equipment 700.

The user equipment 700 also includes an operating system 734 and software components 736 which are described in more detail below. The operating system 734 and the software components 736 that are executed by the main processor 702 are typically stored in a persistent store such as the flash memory 708, which may alternatively be a read-only memory (ROM) or similar storage element (not shown). Those skilled in the art will appreciate that portions of the operating system 734 and the software components 736 such as specific device applications, or parts thereof, may be temporarily loaded into a volatile store such as the RAM 706. Other software components can also be included, as is well known to those skilled in the art.

The subset of software components 736 that control basic device operations, including data and voice communication applications, will normally be installed on the user equipment 700 during its manufacture. Other software applications include a message application 738 that can be any suitable software program that allows a user of the user equipment 700 to send and receive electronic messages. Various alternatives exist for the message application 738 as is well known to those skilled in the art. Messages that have been sent or received by the user are typically stored in the random access or flash memory 708 of the user equipment 700 or some other suitable storage element in the user equipment 700. In at least some embodiments, some of the sent and received messages may be stored remotely from the device 700 such as in a data store of an associated host system that the user equipment 700 communicates with.

The software applications can further include a device state module 740, a Personal Information Manager (PIM) 742, and other suitable modules (not shown). The device state module 740 provides persistence, i.e. the device state module 740 ensures that important device data is stored in persistent memory, such as the flash memory 708, so that the data is not lost when the user equipment 700 is turned off or loses power.

The PIM 742 includes functionality for organizing and managing data items of interest to the user, such as, but not limited to, e-mail, contacts, calendar events, voice mails, appointments, and task items. A PIM application has the ability to send and receive data items via the wireless network 701. PIM data items may be seamlessly integrated, synchronized, and updated via the wireless network 701 with the user equipment subscriber's corresponding data items stored or associated with a host computer system. This functionality creates a mirrored host computer on the user equipment 700 with respect to such items. This can be particularly advantageous when the host computer system is the user equipment subscriber's office computer system.

The user equipment 700 also includes a connect module 744, and an IT policy module 746. The connect module 744 implements the communication protocols that are required for the user equipment 700 to communicate with the wireless infrastructure and any host system, such as an enterprise system, that the user equipment 700 is authorized to interface with. Examples of a wireless infrastructure and an enterprise system are given in FIG. 10 described in more detail below.

The connect module 744 includes a set of APIs that can be integrated with the user equipment 700 to allow the user equipment 700 to use any number of services associated with the enterprise system. The connect module 744 allows the user equipment 700 to establish an end-to-end secure, authenticated communication pipe with the host system. A subset of applications for which access is provided by the connect module 744 can be used to pass IT policy commands from the host system to the user equipment 700. This can be done in a wireless or wired manner. These instructions can then be passed to the IT policy module 746 to modify the configuration of the device 700. Alternatively, in some cases, the IT policy update can also be done over a wired connection.

The IT policy module 746 receives IT policy data that encodes the IT policy. The IT policy module 746 then ensures that the IT policy data is authenticated by the user equipment 700. The IT policy data can then be stored in the flash memory 708 in its native form. After the IT policy data is stored, a global notification can be sent by the IT policy module 746 to all of the applications residing on the user equipment 700. Applications for which the IT policy may be applicable then respond by reading the IT policy data to look for IT policy rules that are applicable.

The IT policy module 746 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some embodiments, the IT policy module 746 can determine which applications are affected by the IT policy data and send a notification to only those applications. In either of these cases, for applications that aren't running at the time of the notification, the applications can call the parser or the IT policy module 746 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore, the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 746 sends an acknowledgement back to the host system to indicate that the IT policy data was received and successfully applied.

Other types of software applications can also be installed on the user equipment 700. These software applications can be third party applications, which are added after the manufacture of the user equipment 700. Examples of third party applications include games, calculators, utilities, etc.

The additional applications can be loaded onto the user equipment 700 through at least one of the wireless network 701, the auxiliary I/O subsystem 712, the data port 714, the short-range communications subsystem 722, or any other suitable device subsystem 724. This flexibility in application installation increases the functionality of the user equipment 700 and may provide enhanced on-device functions, communication-related functions, or both. For example, secure communication applications may enable electronic commerce functions and other such financial transactions to be performed using the user equipment 700.

The data port 714 enables a subscriber to set preferences through an external device or software application and extends the capabilities of the user equipment 700 by providing for information or software downloads to the user equipment 700 other than through a wireless communication network. The alternate download path may, for example, be used to load an encryption key onto the user equipment 700 through a direct, and thus reliable and trusted connection, to provide secure device communication.

The data port 714 can be any suitable port that enables data communication between the user equipment 700 and another computing device. The data port 714 can be a serial or a parallel port. In some instances, the data port 714 can be a USB port that includes data lines for data transfer and a supply line that can provide a charging current to charge the battery 730 of the user equipment 700.

The short-range communications subsystem 722 provides for communication between the user equipment 700 and different systems or devices, without the use of the wireless network 701. For example, the subsystem 722 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 704 and input to the main processor 702. The main processor 702 will then process the received signal for output to the display 710 or alternatively to the auxiliary I/O subsystem 712. A subscriber may also compose data items, such as e-mail messages, for example, using the keyboard 716 in conjunction with the display 710 and possibly the auxiliary I/O subsystem 712. The auxiliary subsystem 712 may include devices such as: a touch screen, mouse, track ball, infrared fingerprint detector, or a roller wheel with dynamic button pressing capability. The keyboard 716 is preferably an alphanumeric keyboard or telephone-type keypad. However, other types of keyboards may also be used. A composed item may be transmitted over the wireless network 200 through the communication subsystem 704.

For voice communications, the overall operation of the user equipment 700 is substantially similar, except that the received signals are output to the speaker 718, and signals for transmission are generated by the microphone 720. Alternative voice or audio I/O subsystems, such as a voice message recording subsystem, can also be implemented on the user equipment 700. Although voice or audio signal output is accomplished primarily through the speaker 718, the display 710 can also be used to provide additional information such as the identity of a calling party, duration of a voice call, or other voice call related information.

Figure 10:
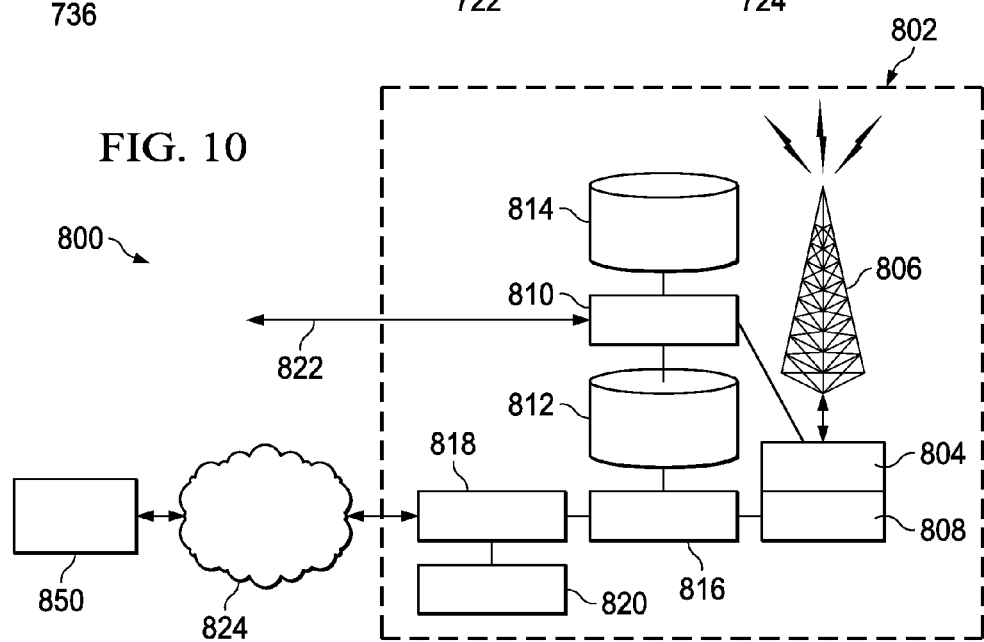
FIG. 10 is a block diagram of a node of a wireless network.

Referring now to FIG. 10, there is depicted a block diagram of an illustrative implementation of a node 802 of the wireless network 701. In practice, the wireless network 701 comprises one or more nodes 802. In conjunction with the connect module 744, the user equipment 700 can communicate with the node 802 within the wireless network 701. In the illustrative implementation 800, the node 802 is configured in accordance with General Packet Radio Service (GPRS) and Global Systems for Mobile (GSM) technologies. However, in other embodiments, node 802 may be configured in accordance with Long Term Evolution (LTE) technology, LTE-Advanced, or IEEE WiMAX. The node 802 includes a base station controller (BSC) 804 with an associated tower station 806, a Packet Control Unit (PCU) 808 added for GPRS support in GSM, a Mobile Switching Center (MSC) 810, a Home Location Register (HLR) 812, a Visitor Location Registry (VLR) 814, a Serving GPRS Support Node (SGSN) 816, a Gateway GPRS Support Node (GGSN) 818, and a Dynamic Host Configuration Protocol (DHCP) 820. This list of components is not meant to be an exhaustive list of the components of every node 802 within a GSM/GPRS network, but rather a list of components that are commonly used in communications through the network 701.

In a GSM network, the MSC 810 is coupled to the BSC 804 and to a landline network, such as a Public Switched Telephone Network (PSTN) 822 to satisfy circuit switched requirements. The connection through the PCU 808, the SGSN 816 and the GGSN 818 to a public or private network (Internet) 824 (also referred to herein generally as a shared network infrastructure) represents the data path for GPRS capable user equipments. In a GSM network extended with GPRS capabilities, the BSC 804 also contains the Packet Control Unit (PCU) 808 that connects to the SGSN 816 to control segmentation, radio channel allocation and to satisfy packet switched requirements. To track the location of the user equipment 700 and availability for both circuit switched and packet switched management, the HLR 812 is shared between the MSC 810 and the SGSN 816. Access to the VLR 814 is controlled by the MSC 810.

The station 806 is a fixed transceiver station and together with the BSC 804 form fixed transceiver equipment. The fixed transceiver equipment provides wireless network coverage for a particular coverage area commonly referred to as a "cell". The fixed transceiver equipment transmits communication signals to, and receives communication signals from, user equipments within its cell via the station 806. The fixed transceiver equipment normally performs such functions as modulation and possibly encoding or encryption of signals to be transmitted to the user equipment 700 in accordance with particular, usually predetermined, communication protocols and parameters, under control of its controller. The fixed transceiver equipment similarly demodulates and possibly decodes and decrypts, if necessary, any communication signals received from the user equipment 700 within its cell. Communication protocols and parameters may vary between different nodes. For example, one node may employ a different modulation scheme and operate at different frequencies than other nodes.

For all user equipment 700 registered with a specific network, permanent configuration data such as a user profile is stored in the HLR 812. The HLR 812 also contains location information for each registered user equipment and can be queried to determine the current location of a user equipment device. The MSC 810 is responsible for a group of location areas and stores the data of the user equipment devices currently in its area of responsibility in the VLR 814. Further, the VLR 814 also contains information on user equipment devices that are visiting other networks. The information in the VLR 814 includes part of the permanent user equipment data transmitted from the HLR 812 to the VLR 814 for faster access. By moving additional information from a remote HLR 812 node to the VLR 814, the amount of traffic between these nodes can be reduced so that voice and data services can be provided with faster response times and at the same time requiring less use of computing resources.

The SGSN 816 and the GGSN 818 are elements added for GPRS support; namely, packet switched data support, within GSM. The SGSN 816 and the MSC 810 have similar responsibilities within the wireless network 701 by keeping track of the location of each user equipment 700. The SGSN 816 also performs security functions and access control for data traffic on the wireless network 701. The GGSN 818 provides internetworking connections with external packet switched networks and connects to one or more SGSN's 816 via an Internet Protocol (IP) backbone network operated within the network 701. During normal operations, a given user equipment 700 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 820 connected to the GGSN 818. There are many mechanisms for dynamic IP assignment, including using a combination of a Remote Authentication Dial-In User Service (RADIUS) server and a DHCP server. Once the GPRS Attach is complete, a logical connection is established from a user equipment 700, through the PCU 808, and the SGSN 816 to an Access Point Node (APN) within the GGSN 818. The APN represents a logical end of an IP tunnel that can either access direct Internet compatible services or private network connections. The APN also represents a security mechanism for the network 701, insofar as each user equipment 700 must be assigned to one or more APNs and user equipments 700 cannot exchange data without first performing a GPRS Attach to an APN that it has been authorized to use. The APN may be considered to be similar to an Internet domain name.

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 701. To maximize use of the PDP Contexts, the network 701 will run an idle timer for each PDP Context to determine if there is a lack of activity. When a user equipment 700 is not using its PDP Context, the PDP Context can be de-allocated and the IP address returned to the IP address pool managed by the DHCP server 820.

By now it should be appreciated that there is disclosed herein a method, apparatus, computer program product, and system for receiving signals and aligning interference at a rank d receiver having K receive antennas from first and second transmitters each having M transmit antennas. As disclosed, a receiver assembles first and second channel matrices for first and second transmitters, respectively. This information may be assembled by receiving pilot signals from the first and second transmitters, and then determining a first channel matrix ($H_1$) for the first transmitter and a second channel matrix ($H_2$) for the second transmitter based on the pilot signals. The receiver also determines the first and second rank values $d_1$, $d_2$ for the signals to be received from the first and second transmitter, respectively. In addition, the receiver computes first and second combining matrices, where the first combining matrix ($r_1 = v_{ref}^H H_2^+$) is computed from an inverse of the second channel matrix and $d_1$ predetermined vectors selected from a plurality of predetermined vectors having size M, where the plurality of predetermined vectors is known to the first and second transmitters and to each receiver affiliated with the first and second transmitters, and may be constructed as a set of orthogonal basis vectors for an M-dimensional transmission space. The receiver also computes the second combining matrix ($r_2 = v_{ref}^H H_1^+$) from an inverse of the first channel matrix and $d_2$ predetermined vectors selected from the plurality of predetermined vectors having size M. By applying the first and second combining vectors to decode rank $d_1$ and $d_2$ data signals received at the receiver from the first and second transmitter, the first combining matrix effectively projects all cross channels from the second transmitter to the $d_1$ predetermined vectors to reduce or eliminate interference from the second transmitter, and the second combining matrix effectively projects all cross channels from the first transmitter to the $d_2$ predetermined vectors to reduce or eliminate interference from the first transmitter. The receiver may also be configured to compute (and feed back) a first equivalent direct channel matrix ($H_1^{eq}$) for the first transmitter by computing one or more equivalent direct channel vectors for each of the $d_1$ predetermined vectors as a product of a complex transpose of each predetermined vector and an inverse of the second channel matrix ($H_2^+$) and the first channel matrix ($H_1$). In similar fashion, the receiver may be configured to compute (and feed back) a second equivalent direct channel matrix ($H_2^{eq}$) for the second transmitter by computing one or more equivalent direct channel vectors for each of the $d_2$ predetermined vectors as a product of a complex transpose of each predetermined vector and an inverse of the first channel matrix ($H_1^+$) and the second channel matrix ($H_2$). In addition to (optionally) feeding back the equivalent direct channel matrices to the respective transmitters, the receiver may also feed back CQI, RI or PMI information to either or both of the first and second transmitters, such as by computing and feeding back an equivalent noise power indicator for the first transmitter by computing for each of the $d_1$ predetermined vectors as the norm of the product of an Hermitian of the predetermined vector ($v_{ref}^H$) and an inverse of the second channel matrix ($H_2^+$). In selected embodiments where the number of receiver antennas is less than the number of transmit antennas (K is less than M), the first combining matrix may be computed by finding, for each of the $d_1$ predetermined vectors, a combining vector ($r_2$) for each of $d_1$ data streams which minimizes an Euclidean distance of an equivalent cross channel ($r_2 H_2$) to an Hermitian of the predetermined vector ($v_{ref}^l)^H$). In these embodiments, a first equivalent direct channel matrix may be computed as $$h_1^{l,eq} = \frac{(v_{ref}^l)^H H_2^+ H_1}{\|(v_{ref}^l)^H H_2^+ H_2\|},$$

l=1, . . . , d1. In other embodiments where K is less than M, the equivalent direct channel matrix may be computed by extending the first channel matrix ($H_1$) and second channel matrix ($H_2$) in a time or frequency domain to compute an aggregate first channel matrix and an aggregate second channel matrix which are invertible with a probability of almost one in a multipath rich propagation environment. In this way, the first equivalent channel matrix is computed from the aggregate first channel matrix and the aggregate second channel matrix and the $d_1$ predetermined vectors, and the second equivalent channel matrix is computed from the aggregate first channel matrix and the aggregate second channel matrix and the $d_2$ predetermined vectors.

There is also disclosed herein a transmitter device and method of operation for transmitting one or more signals from a first transmitter having M transmit antennas to one or more mixed rank receivers affiliated with the first transmitter, where each of the receivers has K receive antennas and receives interference from a second transmitter having M transmit antennas. As disclosed, the transmitter acquires an equivalent direct channel matrix ($H_i^{eq}$) from each of the one or more receivers, such as by receiving the equivalent direct channel matrix from each of the one or more mixed rank receivers in a feedback uplink signal. The first transmitter obtains a second transmitter maximum rank value ($d_{max}^2$) from a second transmitter which corresponds to a maximum transmission rank for any receiver affiliated with the second transmitter. The first transmitter also selects a subset of the one or more receivers and corresponding ranks for each selected receiver to receive a signal from the first transmitter such that the number of M transmit antennas is not less than a sum of the corresponding ranks and the second transmitter maximum rank value ($d_{max}^2$). In addition, the first transmitter computes an equivalent downlink channel matrix ($H_1^{eq}$) from the equivalent direct channel matrices for the selected subset of receivers. Finally, the transmitter computes a precoding matrix for a signal to be transmitted to the selected subset of receivers, where the precoding matrix is derived from the equivalent downlink channel matrix and from $d_{max}^2$ predetermined vectors selected from a plurality of predetermined vectors having size M to reduce or eliminate interference to any receivers receiving signals from the first transmitter or from the second transmitter. The plurality of predetermined vectors may be implemented as an indexed list of linearly independent, orthogonal basis vectors for an M-dimensional transmission space that are known to each receiver affiliated with the first and second transmitters. In selected embodiments, the precoding matrix for each UE affiliated with each transmitter is computed by computing a null space of the $d_{max}^2$ predetermined vectors and a Hermitian of the equivalent direct channel matrices of the rest of the UEs receiving signal from that transmitter to effectively eliminate interference to any receiver receiving a signal from the first transmitter or from the second transmitter.

In still further embodiments, there is disclosed a user equipment device that is configured to align interference and receive rank d signaling over first and second channels from first and second transmitters each having M transmit antennas. The disclosed UE device includes an array of K receive antennas for receiving one or more signals over first and second channels from first and second transmitters each having M transmit antennas. In addition, the disclosed UE device includes a processor that configured to receive signals and align signal interference from the first and second transmitters by first estimating or computing a first channel matrix and second channel matrix for the first and second channels, respectively, and then determining a first rank $d_1$ and a second rank $d_2$ for a first signal and second signal received over the first and second channels, respectively. To process a signal from the first transmitter, the UE device computes a first combining matrix ($r_1 = v_{ref}^H H_2^+$) as a product of an inverse of the second channel matrix and an Hermitian of $d_1$ predetermined vectors selected from a set of predetermined vectors having size M, where the set of predetermined vectors is known by the first and second transmitters and by any other user equipment devices affiliated with the first or second transmitters. The UE device also computes a second combining matrix ($r_2 = v_{ref}^H H_1^+$) as a product of an inverse of the first channel matrix and an Hermitian of $d_2$ predetermined vectors selected from the set of predetermined vectors having size M. If the receive antenna count K at the UE device is less than the transmit antenna count M at the first transmitter, the processor at the UE may be configured to compute the first combining matrix by computing a combining vector $$r_1^l = \frac{(v_{ref}^l)^H H_2^+}{\left\|(v_{ref}^l)^H H_2^+ H_2\right\|},$$

$l=1, \ldots, d_1$, where $(v_{ref}^l)^H$ is an Hermitian of an lth vector from the $d_1$ predetermined vectors, $H_2$ is an inverse of the second channel matrix, and $H_2$ is the second channel matrix. Alternatively, if K is less than M, the processor at the UE may be configured to compute first and second combining matrices by extending the first channel matrix and second channel matrix in a time or frequency domain to compute an aggregate first channel matrix and an aggregate second channel matrix which are invertible with a probability of almost one in a multipath rich propagation environment. With these aggregate matrices, the UE device computes the first combining matrix as a product of an Hermitian of the $d_1$ predetermined vectors and an inverse of the aggregate second channel matrix, and the second combining matrix is computed as a product of an Hermitian of the $d_2$ predetermined vectors and an inverse of the aggregate first channel matrix. Each UE device may also be configured to feed back to the first transmitter and second transmitters a first equivalent direct channel matrix ($H_1^{eq}$) for the first transmitter and a second equivalent direct channel matrix ($H_2^{eq}$) for the second transmitter, where the first equivalent direct channel matrix ($H_1^{eq}$) comprises one or more equivalent direct channel vectors computed for each of the $d_1$ predetermined vectors as a product of a complex transpose of each predetermined vector and an inverse of the second channel matrix ($H_2^+$) and the first channel matrix ($H_1$), and where the second equivalent direct channel matrix ($H_2^{eq}$) comprises one or more equivalent direct channel vectors computed for each of the $d_2$ predetermined vectors as a product of a complex transpose of each predetermined vector and an inverse of the first channel matrix ($H_1^+$) and the second channel matrix ($H_2$). Channel quality indicator information may also be computed and fed back. For example, a first effective noise power indicator may be fed back to the first transmitter that is derived from a first equivalent noise power indicator that is computed, for each of the $d_1$ predetermined vectors, as a norm of the product of an Hermitian of the predetermined vector ($v_{ref}^H$) and an inverse of the second channel matrix ($H_2^+$). Likewise, a second effective noise power indicator may be fed back that is derived from a second equivalent noise power indicator that is computed, for each of the $d_2$ predetermined vectors, as a norm of the product of an Hermitian of the predetermined vector ($v_{ref}^H$) and an inverse of the first channel matrix ($H_1^+$). Finally, the UE device applies the first and second combining matrices to decode data signals received at the UE device from the first and second transmitters to project all cross channel signals to an Hermitian of the predetermined vectors to reduce or eliminate interference from the second transmitter.

In yet still further embodiments, a computer program product is disclosed that includes a non-transitory computer readable storage medium having computer readable program code embodied therein with instructions which are adapted to be executed to implement a method for operating mixed rank user equipment (UE) and/or access device (e.g., radio access network, such as an eNB) to align interference and receive signals over first and second channels from first and second transmitters or eNB stations, each having M transmit antennas, substantially as described hereinabove. As disclosed, the computer program controls the processor to perform processes at the UE and eNB devices for aligning interference by applying a plurality of linearly independent vectors $v_{ref} = \{v_{ref}^1, \ldots, v_{ref}^M\}$ and channel knowledge $H_1$, $H_2$ from each transmitter at each UE to convert the cross channel interference to the predetermined vectors $(v_{ref}^1)^H$ and compute and feedback equivalent channel matrix information $H_{i,j}^{eq}$ to its affiliated transmitter. With this information, each transmitter selects $L_i$ receivers and constructs a transmitted signal by applying a selected precoding matrix. In selected embodiments, the computer program is embodied on a computer-readable non-transitory storage medium with program instructions for aligning interference from a cross channel by performing a sequence of steps. In the preliminary step(s), first and second channel matrices are estimated for the first and second channels to the receiver having K receive antennas from first and second transmitters having M transmit antennas. After determining a first rank $d_1$ and a second rank $d_2$ for a first signal and second signal received over the first and second channels, respectively, $d_1$ predetermined vectors are selected from a set of predetermined vectors having size M, where the set of predetermined vectors is known by the first and second transmitters. Subsequently, a first combining matrix is computed as a product of an Hermitian of the $d_1$ predetermined vectors and an inverse of the second channel matrix, and the first combining matrix is applied to decode rank $d_1$ data signals received at the receiver from the first transmitter to project interference from the second transmitter to an Hermitian of the $d_1$ predetermined vectors to reduce or eliminate interference from the second transmitter. In similar fashion, $d_2$ predetermined vectors are selected from the set of predetermined vectors, a second combining matrix is computed as a product of an Hermitian of the $d_2$ predetermined vectors and an inverse of the first channel matrix, and the second combining matrix is applied to decode rank $d_2$ data signals received at the receiver from the second transmitter to project interference from the first transmitter to an Hermitian of the $d_2$ predetermined vectors to reduce or eliminate interference from the first transmitter. In addition, the computer program is configured to align interference by feeding back to the first transmitter and second transmitters a first equivalent direct channel matrix $(H_1^{eq})$ for the first transmitter and a second equivalent direct channel matrix $(H_2^{eq})$ for the second transmitter, where the first equivalent direct channel matrix $(H_1^{eq})$ is computed for each of the $d_1$ predetermined vectors as a product of a complex transpose of each predetermined vector and an inverse of the second channel matrix $(H_2^+)$ and the first channel matrix $(H_1)$, and where the second equivalent direct channel matrix $(H_2^{eq})$ is computed for each of the $d_2$ predetermined vectors as a product of a complex transpose of each predetermined vector and an inverse of the first channel matrix $(H_1^+)$ and the second channel matrix $(H_2)$.

In still further embodiments, a receiver scheduling method and apparatus are disclosed for selecting and scheduling a plurality of rank d receivers having K receive antennas to receive one or more data streams from a first transmitter having M transmit antennas where one or more of the plurality of receivers may also receive one or more data streams from a second transmitter having M transmit antennas. As disclosed, the first transmitter obtains or otherwise negotiates a first maximum rank measure $d_m^{max}$ and a second maximum rank measure $d_2^{max}$, where the first maximum rank measure $d_1^{max}$ identifies a maximum rank value for any signal to be sent by the first transmitter to the plurality of receivers, and the second maximum rank measure $d_2^{max}$ identifies a maximum rank value for any signal to be sent by the second transmitter. In addition, the first transmitter assembles CDI and CQI values for each data stream to be sent to each of the plurality of rank d receivers, such as by receiving CDI and CQI values or indicators thereof in a feedback uplink signal from each of the plurality of rank d receivers. The CDI and CQI values associated with a data stream at a rank d receiver are each derived from at least an equivalent direct channel matrix computed from one or more predetermined vectors having size M which are applied to project all cross channels from the second transmitter to the one or more predetermined vectors to reduce or eliminate interference from the second transmitter. For example, the CDI value in selected embodiments may be computed for each data stream at a rank d receiver as $$CDI^l \triangleq \frac{h^{l,eq}}{\|h^{l,eq}\|},$$

for $l=1 \ldots d$, where $h^{l,eq}$ is the equivalent direct channel matrix for each of d data streams to be sent to said receiver that is computed by computing for each of the d predetermined vectors a product of (1) a complex transpose of each predetermined vector, (2) an inverse of a channel matrix for a cross channel from the second transmitter to said receiver, and (3) a channel matrix for a direct channel from the first transmitter to said receiver. In other embodiments, the CQI value may be computed for each data stream at a rank d receiver as $$CQI^l \triangleq \frac{\|h^{l,eq}\|^2 - |h^{l,eq} v_{ref}^l|^2}{\Re^{l,eff}},$$

for $l=1 \ldots d$, where $h^{l,eq}$ is the equivalent direct channel matrix for each of d data streams to be sent to said receiver that is computed by computing for each of the d predetermined vectors a product of (1) a complex transpose of each predetermined vector $v_{ref}^l$, (2) an inverse of a channel matrix for a cross channel from the second transmitter to said receiver, and (3) a channel matrix for a direct channel from the first transmitter to said receiver, and where $\Re^{l,eff}$ is an effective noise power indicator. The first transmitter then selects a first rank d receiver from the plurality of rank d receivers by computing a weighted CQI value for each data stream and choosing a rank d receiver having the largest weighted CQI value. For example, the weighted CQI value may be computed as a product of a proportional fairness scheduling parameter and the CQI value for each data stream. The remaining receivers are then scheduled by sequentially selecting one or more rank d receivers from the plurality of rank d receivers by computing a measure of orthogonality with respect to any previously selected rank d receiver that is derived from at least the CDI values and choosing a rank d receiver having the largest measure of orthogonality with respect to any previously selected rank d receiver until a summation of rank signal for the selected receivers exceeds $M-d_2^{max}$. For example, the rank d receivers may be sequentially selected by projecting, for each unselected receiver, the assembled CQI values over a defined sub-space spanned by CDI values of any previously selected receivers to generate a projection value, and then selecting a rank d receiver having the smallest projection value representing the largest measure of orthogonality value with respect to any previously selected rank d receiver. Alternatively, the rank d receivers may be sequentially selected by computing the measure of orthogonality, for each unselected receiver, as a product of a scheduling parameter associated with said receiver, one or more CQI values associated with said receiver, and an orthogonality measure derived from a projection of the assembled CQI values over a defined sub-space spanned by CDI values of any previously selected receivers to generate a projection value; and then selecting a rank d receiver having the largest projection value. With this approach, the scheduling scheme may be applied to a plurality of mixed rank or single rank receivers where one or more of the plurality of rank d receivers has a rank that is not fixed over time.

It should be understood that as used herein, terms such as coupled, connected, electrically connected, in signal communication, and the like may include direct connections between components, indirect connections between components, or both, as would be apparent in the overall context of a particular embodiment. The term coupled is intended to include, but not be limited to, a direct electrical connection.

Numerous modifications and variations of the present application are possible in light of the above teachings. It is therefore to be understood that within the scope of the appended claims, the embodiments of the application may be practiced otherwise than as specifically described herein.

Although the described exemplary embodiments disclosed herein are described with reference to a new downlink multi-user MIMO interference alignment scheme, the present disclosure is not necessarily limited to the example embodiments which illustrate inventive aspects of the present disclosure that are applicable to a wide variety of signaling schemes and applications. Thus, the particular embodiments disclosed above are illustrative only and should not be taken as limitations upon the present disclosure, as the disclosure may be modified and practiced in different but equivalent manners apparent to those skilled in the art having the benefit of the teachings herein. Accordingly, the foregoing description is not intended to limit the disclosure to the particular form set forth, but on the contrary, is intended to cover such alternatives, modifications and equivalents as may be included within the spirit and scope of the disclosure as defined by the appended claims so that those skilled in the art should understand that they can make various changes, substitutions and alterations without departing from the spirit and scope of the disclosure in its broadest form.

What is claimed is:

1. A method for receiving signals and aligning signal and interference at a rank d receiver having a number (K) of receive antennae from first and second transmitters each having a number (M) of transmit antennae, comprising:
   assembling at the receiver a first channel matrix ($H_1$) and a second channel matrix ($H_2$) for the first transmitter and the second transmitter, respectively;
   determining a first rank $d_1$ of a first signal received from the first transmitter;
   determining a second rank $d_2$ of a second signal received from the second transmitter;
   computing a first combining matrix $r_1 = v_{ref}^H H_2^+$ from a second channel inverse ($H_2^+$) of the second channel matrix ($H_2$) and $d_1$ predetermined vectors selected from a plurality of predetermined vectors having size M, the first combining matrix defined as $r_1 = v_{ref}^H H_2^+$, where ($r_1$) is the first combining matrix, and ($v_{ref}^H$) is a Hermitian of the d1 predetermined vectors;
   computing a second combining matrix $r_2 = v_{ref}^H H_1^+$ from a first channel inverse ($H_1^+$) of the first channel matrix ($H_1$) and $d_2$ predetermined vectors selected from the plurality of predetermined vectors having size M, the second combining, matrix defined as ($r_2 = v_{ref}^H H_1^+$), where ($r_2$) is the second combining matrix, ($v_{ref}^H$) is a Hermitian of the d2 predetermined vectors, and ($H_1^+$) is a first channel inverse of the first channel matrix ($H_1$);
   applying the first combining matrix to decode rank $d_1$ data signals received at the receiver from the first transmitter, where the first combining matrix projects all cross channels from the second transmitter to the $d_1$ predetermined vectors to reduce or eliminate interference from the second transmitter; and
   applying the second combining matrix to decode rank $d_2$ data signals received at the receiver from the second transmitter, where the second combining matrix projects all cross channels from the first transmitter to the $d_2$ predetermined vectors to reduce or eliminate interference from the first transmitter,
   wherein the number of (K) receive antennae is at least two and the number of (M) transmit antennae is at least two.

2. The method of claim 1, where assembling the first channel matrix and the second channel matrix comprises:
   receiving pilot signals from the first transmitter and the second transmitter; and
   determining the first channel matrix ($H_1$) for the first transmitter and the second channel matrix ($H_2$) for the second transmitter based on the pilot signals.

3. The method of claim 1, further comprising computing a first equivalent direct channel matrix ($H_1^{eq}$) for the first transmitter by computing one or more equivalent direct channel vectors for each of the $d_1$ predetermined vectors as a product of a complex transpose of each predetermined vector and the second channel inverse ($H_2^+$) and the first channel matrix ($H_1$).

4. The method of claim 3, further comprising computing a second equivalent direct channel matrix ($H_2^{eq}$) for the second transmitter by computing one or more equivalent direct channel vectors for each of the $d_2$ predetermined vectors as a product of a complex transpose of each predetermined vector and the first channel inverse ($H_1^+$) and the second channel matrix ($H_2$).

5. The method of claim 3, further comprising feeding back the first equivalent channel matrix to the first and second transmitters.

6. The method of claim 1, where the plurality of predetermined vectors is known to the first and second transmitters.

7. The method of claim 1, where the plurality of predetermined vectors is a set of orthogonal basis vectors for an M-dimensional transmission space.

8. The method of claim 1, further comprising feeding back one or more of a channel quality indicator (CQI), rank indicator (RI), or precoding matrix information (PMI) from the receiver to at least one of the first and second transmitters.

9. The method of claim 1, further comprising:
   computing at the receiver an equivalent noise power indicator for the first transmitter by computing for each of the $d_1$ predetermined vectors a norm of the product of an Hermitian of each of said d1 predetermined vectors $[(v_{ref}^H)]$ and the second channel inverse $H_2^+$ and
   feeding back to the first transmitter the equivalent noise power indicator.

10. The method of claim 1, where computing the first combining matrix ($r_1$) comprises finding, for each of the $d_1$ predetermined vectors, a combining vector ($r_1^i$) for each of $d_1$ data streams which minimizes a Euclidean distance of an equivalent cross channel ($r_1^i H_2^+$) to a Hermitian ($v_{ref}^i)^H$ of each of the d1 predetermined vectors $[(v_{ref}^i)^H)]$ when K is less than M.

11. The method of claim 10, further comprising computing a first equivalent direct channel matrix $$h_1^{l,eq} = \frac{(v_{ref}^l)^H H_2^+ H_1}{\|(v_{ref}^l)^H H_2^+ H_2\|},$$

$l=1, \ldots, d_1$.

12. The method of claim 1, further comprising computing a first equivalent direct channel matrix from the first channel matrix ($H_1$) to the second channel matrix ($H_2$) when K is less than M by:
    extending the first channel matrix ($H_1$) and the second channel matrix ($H_2$) in time or frequency domain to compute an aggregate first channel matrix and an aggregate second channel matrix which are invertible with a probability of almost one in a multipath Rich Propagation Environment;
    computing the first equivalent channel matrix from the aggregate first channel matrix and the aggregate second channel matrix and the $d_1$ predetermined vectors; and
    computing the second equivalent channel matrix from the aggregate first channel matrix and the aggregate second channel matrix and the $d_2$ predetermined vectors.

13. A user equipment device configured to align interference and receive rank d signaling over first and second channels from first and second transmitters each having a number (M) transmit antennae, comprising:
    an array of a number (K) of receive antennae for receiving one or more signals over first and second channels from first and second transmitters each having M transmit antennae; and
    a processor configured to receive signals and align signal interference from the first and second transmitters by:
    computing a first channel matrix and second channel matrix for the first and second channels, respectively;
    determining a first rank $d_1$ and a second rank $d_2$ for a first signal and second signal received over the first and second channels, respectively;
    computing a first combining matrix $r_1 = v_{ref}^H H_2^+$ as a product of a first inverse ($H_1^+$) of the second channel matrix ($H_2$) and an Hermitian of $d_1$ predetermined vectors selected from a set of predetermined vectors having size M, the first combining matrix defined as $r_1 = v_{ref}^H H_2^+$, where ($r_1$) is the first combining matrix, ($v_{ref}^H$) is a Hermitian of the d1 predetermined vectors, and $H_2$ is a first inverse of the second channel matrix ($H_2$), and where the set of predetermined vectors is known by the first and second transmitters and by any other user equipment devices affiliated with the first or second transmitters;
    computing a second combining matrix $r_2 = v_{ref}^H H_1^+$ as a product of a second inverse ($H_2^+$) of the first channel matrix ($H_1$) and an Hermitian of $d_2$ predetermined vectors selected from the set of predetermined vectors having size M;
    applying the first combining matrix to decode rank $d_1$ data signals received at the receiver from the first transmitter, where the first combining matrix projects all cross channels from the second transmitter to the $d_1$ predetermined vectors to reduce or eliminate interference from the second transmitter; and
    applying the second combining matrix to decode rank $d_2$ data signals received at the receiver from the second transmitter, where the second combining matrix projects all cross channels from the first transmitter to the $d_2$ predetermined vectors to reduce or eliminate interference from the first transmitter,
    wherein the number (K) receive antennae is at least two and the number of (M) transmit antennae is at least two.

14. The user equipment device of claim 13, where the processor is configured to feed back to the first transmitter and the second transmitter a first equivalent direct channel matrix ($H_1^{eq}$) for the first transmitter and a second equivalent direct channel matrix ($H_2^{eq}$) for the second transmitter, where the first equivalent direct channel matrix ($H_1^{eq}$) comprises one or more equivalent direct channel vectors computed for each of the $d_1$ predetermined vectors as a product of a complex transpose of each predetermined vector and the first inverse ($H_2^+$) and the first channel matrix ($H_1$), and where the second equivalent direct channel matrix ($H_2^{eq}$) comprises one or more equivalent direct channel vectors computed for each of the $d_2$ predetermined vectors as a product of a complex transpose of each predetermined vector and the second inverse ($H_1^+$) and the second channel matrix ($H_2$).

15. The user equipment device of claim 14, where the processor is configured to feed back channel quality indicator information by:
    computing and feeding back to the first transmitter a first effective noise power indicator derived from a first equivalent noise power indicator that is computed, for each of the $d_1$ predetermined vectors, as a norm of the product of each of said d1 predetermined vectors [($v_{ref}^H$)] and the first inverse ($H_2^+$); and
    computing and feeding back to the second transmitter a second effective noise power indicator derived from a second equivalent noise power indicator that is computed, for each of the $d_2$ predetermined vectors, as a norm of the product of each of said d2 predetermined vectors [($v_{ref}^H$) an Hermitian of the predetermined vector ($v_{ref}^H$)] and the second inverse ($H_1^+$).

16. The user equipment device of claim 13, where the processor is configured to compute the first combining matrix when K is less than M by computing a combining vector $$r_1^l = \frac{(v_{ref}^l)^H H_2^+}{\|(v_{ref}^l)^H H_2^+ H_2\|},$$

$l=1, \ldots, d_1$, where $(v_{ref}^l)^H$ is an Hermitian of an lth vector from the $d_1$ predetermined vectors.

17. The user equipment device of claim 13, where the processor is configured to compute the first and second combining matrices when K is less than M by:
    extending the first channel matrix and second channel matrix in time or frequency domain to compute an aggregate first channel matrix and an aggregate second channel matrix which are invertible with a probability of almost one in a multipath Rich Propagation Environment;
    computing the first combining matrix as a product of an Hermitian of the $d_1$ predetermined vectors and an inverse of the aggregate second channel matrix; and
    computing the second combining matrix as a product of an Hermitian of the $d_2$ predetermined vectors and an inverse of the aggregate first channel matrix.

* * * * *